(12) United States Patent
Szabo

(10) Patent No.: US 8,447,871 B1
(45) Date of Patent: May 21, 2013

(54) SIMPLIFIED METHOD FOR PROCESSING MULTIPLE CONNECTIONS FROM THE SAME CLIENT

(75) Inventor: Paul I. Szabo, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 654 days.

(21) Appl. No.: 12/110,129

(22) Filed: Apr. 25, 2008

Related U.S. Application Data

(60) Division of application No. 10/150,422, filed on May 17, 2002, which is a continuation-in-part of application No. 09/814,415, filed on Mar. 21, 2001, now Pat. No. 7,343,413.

(60) Provisional application No. 60/191,019, filed on Mar. 21, 2000.

(51) Int. Cl.
*G06F 15/16* (2006.01)
(52) U.S. Cl.
USPC .......................................... 709/229; 709/225
(58) Field of Classification Search
USPC ................................................ 709/229, 225
See application file for complete search history.

(56) References Cited

U.S. PATENT DOCUMENTS

| | | | |
|---|---|---|---|
| 3,950,735 A | 4/1976 | Patel | 340/172.5 |
| 4,644,532 A | 2/1987 | George et al. | 370/94 |
| 4,897,781 A | 1/1990 | Chang et al. | |
| 4,965,772 A | 10/1990 | Daniel et al. | 364/900 |
| 5,023,826 A | 6/1991 | Patel | 364/736 |
| 5,053,953 A | 10/1991 | Patel | 364/200 |
| 5,299,312 A | 3/1994 | Rocco, Jr. | 395/200 |
| 5,327,529 A | 7/1994 | Fults et al. | 395/155 |
| 5,367,635 A | 11/1994 | Bauer et al. | 395/200 |
| 5,371,852 A | 12/1994 | Attanasio et al. | 395/200 |
| 5,406,502 A | 4/1995 | Haramaty | 364/551.1 |
| 5,475,857 A | 12/1995 | Dally | 395/800 |

(Continued)

FOREIGN PATENT DOCUMENTS

| | | |
|---|---|---|
| EP | 0 744 850 | 11/1996 |
| WO | WO 91/14326 | 9/1991 |

(Continued)

OTHER PUBLICATIONS

"A Process for Selective Routing of Servlet Content to Transcoding Modules," *Research Disclosure* 422124, IBM Corporation, pp. 889-890, Jun. 1999. (2 pages).

(Continued)

*Primary Examiner* — Liangche A Wang
(74) *Attorney, Agent, or Firm* — LeClairRyan, a Professional Corporation

(57) ABSTRACT

An apparatus is related to connection management for a communications network. A control component receives a data flow requesting a resource from a client, identifies the client, and determines when the data flow is unassociated with a connection to a requested resource. The control component selects a new content server for an unassociated resource request when either the identified client was previously unknown or the identified client has exceeded a maximum number of connections with a previously selected content server. The control component selects the previously selected content server when the identified client has not exceeded the maximum number of connections. A switch component is employed to maintain a connection between the client and the selected content server such that the client receives the requested resource. Utilizing cached connection information for up to "N" connections enhances the speed of connections between the client and the selected content server.

5 Claims, 25 Drawing Sheets

U.S. PATENT DOCUMENTS

| | | | |
|---|---|---|---|
| 5,517,617 A | 5/1996 | Sathaye et al. | 395/200.1 |
| 5,519,694 A | 5/1996 | Brewer et al. | 370/54 |
| 5,519,778 A | 5/1996 | Leighton et al. | 380/30 |
| 5,521,591 A | 5/1996 | Arora et al. | 340/826 |
| 5,528,701 A | 6/1996 | Aref | 382/178 |
| 5,581,764 A | 12/1996 | Fitzgerald et al. | 395/703 |
| 5,596,742 A | 1/1997 | Agarwal et al. | 395/500 |
| 5,606,665 A | 2/1997 | Yang et al. | 395/200.2 |
| 5,611,049 A | 3/1997 | Pitts | 395/200.9 |
| 5,663,018 A | 9/1997 | Cummings et al. | 430/5 |
| 5,752,023 A | 5/1998 | Chourci et al. | 395/610 |
| 5,761,484 A | 6/1998 | Agarwal et al. | 395/500 |
| 5,768,423 A | 6/1998 | Aref et al. | 382/228 |
| 5,774,660 A | 6/1998 | Brendel et al. | 395/200.31 |
| 5,790,554 A | 8/1998 | Pitcher et al. | 370/471 |
| 5,802,052 A | 9/1998 | Venkataraman | 370/395.72 |
| 5,812,550 A | 9/1998 | Sohn et al. | |
| 5,825,772 A * | 10/1998 | Dobbins et al. | 370/396 |
| 5,875,296 A | 2/1999 | Shi et al. | 395/188.01 |
| 5,892,914 A | 4/1999 | Pitts | 395/200.49 |
| 5,892,932 A | 4/1999 | Kim | 710/316 |
| 5,919,247 A | 7/1999 | Van Hoff et al. | 709/217 |
| 5,936,939 A | 8/1999 | Des Jardins et al. | 370/229 |
| 5,941,988 A | 8/1999 | Bhagwat et al. | |
| 5,946,690 A | 8/1999 | Pitts | 707/10 |
| 5,949,885 A | 9/1999 | Leighton | 380/54 |
| 5,951,694 A | 9/1999 | Choquier et al. | 714/15 |
| 5,959,990 A | 9/1999 | Frantz et al. | 370/392 |
| 5,974,460 A | 10/1999 | Maddalozzo, Jr. et al. | 709/224 |
| 5,983,281 A | 11/1999 | Ogle et al. | 709/249 |
| 6,006,260 A | 12/1999 | Barrick, Jr. et al. | 709/224 |
| 6,006,264 A | 12/1999 | Colby et al. | 709/226 |
| 6,026,452 A | 2/2000 | Pitts | 710/56 |
| 6,028,857 A | 2/2000 | Poor | 370/351 |
| 6,051,169 A | 4/2000 | Brown et al. | 264/40.1 |
| 6,078,956 A | 6/2000 | Bryant et al. | 709/224 |
| 6,085,234 A | 7/2000 | Pitts et al. | 709/217 |
| 6,092,196 A | 7/2000 | Reiche | 713/200 |
| 6,108,703 A | 8/2000 | Leighton et al. | 709/226 |
| 6,111,876 A | 8/2000 | Frantz et al. | 370/392 |
| 6,128,279 A | 10/2000 | O'Neil et al. | 709/223 |
| 6,128,657 A | 10/2000 | Okanoya et al. | |
| 6,170,022 B1 | 1/2001 | Linville et al. | |
| 6,178,423 B1 | 1/2001 | Douceur et al. | 707/9 |
| 6,182,139 B1 | 1/2001 | Brendel | 709/226 |
| 6,192,051 B1 | 2/2001 | Lipman et al. | 370/389 |
| 6,233,612 B1 | 5/2001 | Fruchtman et al. | 709/223 |
| 6,246,684 B1 | 6/2001 | Chapman et al. | 370/394 |
| 6,253,226 B1 | 6/2001 | Chidambaran et al. | |
| 6,253,230 B1 | 6/2001 | Couland et al. | 709/203 |
| 6,263,368 B1 * | 7/2001 | Martin | 709/224 |
| 6,289,012 B1 | 9/2001 | Harrington et al. | |
| 6,298,380 B1 | 10/2001 | Coile et al. | |
| 6,327,622 B1 | 12/2001 | Jindal et al. | 709/228 |
| 6,336,147 B1 * | 1/2002 | Brownell et al. | 719/310 |
| 6,343,324 B1 * | 1/2002 | Hubis et al. | 709/229 |
| 6,347,339 B1 | 2/2002 | Morris et al. | 709/237 |
| 6,360,270 B1 | 3/2002 | Cherkasova et al. | 709/229 |
| 6,374,300 B2 | 4/2002 | Masters | 709/229 |
| 6,396,833 B1 | 5/2002 | Zhang et al. | 370/392 |
| 6,484,261 B1 | 11/2002 | Wiegel | |
| 6,490,624 B1 | 12/2002 | Sampson et al. | |
| 6,510,135 B1 | 1/2003 | Almulhem et al. | |
| 6,519,643 B1 | 2/2003 | Foulkes et al. | |
| 6,601,084 B1 | 7/2003 | Bhaskaran et al. | 718/105 |
| 6,636,503 B1 | 10/2003 | Shiran et al. | 370/352 |
| 6,636,894 B1 | 10/2003 | Short et al. | 709/225 |
| 6,650,641 B1 | 11/2003 | Albert et al. | 370/392 |
| 6,691,165 B1 | 2/2004 | Bruck et al. | 709/227 |
| 6,708,187 B1 | 3/2004 | Shanumgam et al. | |
| 6,742,045 B1 | 5/2004 | Albert et al. | 709/238 |
| 6,751,663 B1 | 6/2004 | Farrell et al. | 709/224 |
| 6,754,228 B1 | 6/2004 | Ludwig | 370/468 |
| 6,760,775 B1 | 7/2004 | Anerousis et al. | 709/238 |
| 6,772,219 B1 | 8/2004 | Shobatake | 709/238 |
| 6,779,039 B1 | 8/2004 | Bommareddy et al. | 709/238 |
| 6,781,986 B1 | 8/2004 | Sabaa et al. | 370/389 |
| 6,798,777 B1 | 9/2004 | Ferguson et al. | 370/392 |
| 6,816,901 B1 | 11/2004 | Sitaraman et al. | |
| 6,829,238 B2 | 12/2004 | Tokuyo et al. | |
| 6,868,082 B1 | 3/2005 | Allen et al. | 370/360 |
| 6,876,629 B2 | 4/2005 | Beshai et al. | 370/232 |
| 6,876,654 B1 | 4/2005 | Hegde | 370/392 |
| 6,888,836 B1 | 5/2005 | Cherkasova | 370/400 |
| 6,950,434 B1 | 9/2005 | Viswanath et al. | |
| 6,954,780 B2 | 10/2005 | Susai et al. | |
| 6,957,272 B2 | 10/2005 | Tallegas et al. | |
| 6,975,592 B1 | 12/2005 | Seddigh et al. | |
| 7,007,092 B2 | 2/2006 | Peiffer | |
| 7,139,792 B1 | 11/2006 | Mishra et al. | |
| 7,321,926 B1 | 1/2008 | Zhang et al. | |
| 7,343,413 B2 | 3/2008 | Gilde et al. | |
| 7,349,391 B2 | 3/2008 | Ben-Dor et al. | |
| 7,490,162 B1 | 2/2009 | Masters | |
| 7,558,197 B1 | 7/2009 | Sindhu et al. | |
| 8,130,650 B2 | 3/2012 | Allen, Jr. et al. | |
| 2001/0023442 A1 | 9/2001 | Masters | |
| 2002/0059428 A1 | 5/2002 | Susai et al. | |
| 2002/0161913 A1 | 10/2002 | Gonzalez et al. | |
| 2002/0198993 A1 | 12/2002 | Cudd et al. | |
| 2003/0046291 A1 | 3/2003 | Fascenda | |
| 2003/0086415 A1 | 5/2003 | Bernhard et al. | |
| 2003/0225485 A1 | 12/2003 | Fritz et al. | |
| 2005/0122977 A1 | 6/2005 | Lieberman | |
| 2005/0187866 A1 | 8/2005 | Lee | 705/39 |
| 2006/0059267 A1 | 3/2006 | Cugi et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2008/0133518 A1 | 6/2008 | Kapoor et al. | |
| 2009/0049230 A1 | 2/2009 | Pandya | |
| 2009/0141891 A1 | 6/2009 | Boyen et al. | |
| 2009/0287935 A1 | 11/2009 | Aull et al. | |
| 2010/0122091 A1 | 5/2010 | Huang et al. | |
| 2010/0325277 A1 | 12/2010 | Muthiah et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"Servlet/Applet/HTML Authentication Process With Single Sign-On," *Research Disclosure* 429128, IBM Corporation, pp. 163-164, Jan. 2000. (2 pages).

Floyd et al., "Random Early Detection Gateways for Congestion Avoidance," Aug. 1993, pp. 1-22, IEEE/ACM Transactions on Networking, California.

Crescendo Networks, "Application Layer Processing (ALP)", Chapter 9, CN-5000E/5500E, pp. 168-186.

"Traffic Surges; Surge Queue; Netscaler Defense", 2005 Citrix Systems, Inc., PowerPoint Presentation, slides 1-12.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

MacVittie, Lori, "Message-Based Load Balancing," Technical Brief, Jan. 2010, pp. 1-9, F5 Networks, Inc.

F5 Networks, Inc., "Big-IP Controller with Exclusive OneConnect Content Switching Feature Provides a Breakthrough System for Maximizing Server and Network Performance," Press Release, May 8, 2001, 2 pages, Las Vegas, Nevada.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Hochmuth, Phil, "F5, CacheFlow pump up content-delivery lines," May 4, 2001, 1 page, Network World Fusion, Las Vegas, Nevada.

Raghavan B., et al., "Cloud Control with Distributed Rate Limiting", SIGCOMM'07, Aug. 27-31, 2007, pp. 1-11, Department of Computer Science and Engineering, University of California, San Diego, CA.

Snoeren A., et al., "Managing Cloud Resources:Distributed Rate Limited", Building and Programming the Cloud Workshop, Jan. 13, 2010, pp. 1-38, UCSDCSE Computer Science and Engineering.

* cited by examiner

TABLE I: MESSAGE TYPES

| MNEMONIC | DFS SENDS? | CS SENDS? | PRIORITY | BATCHING? | SINGLE MBUF? | STATE SHARING? | EXPECTED RESPONSE | EXPLANATION |
|---|---|---|---|---|---|---|---|---|
| QUERY | Y | N | H | N | Y | N | REPLY | REQUEST FROM THE DFS TO THE CS FOR INSTRUCTIONS ON HANDLING A NEW FLOW. |
| APP_QUERY | Y | N | H | N | N | N | REPLY | QUERY MESSAGE FOR A VIRTUAL SERVER THAT IS LOAD BALANCED USING APPLICATION DATA. |
| REPLY | N | Y | H | N | Y | Y | - | INSTRUCTIONS PROVIDED BY THE CS TO THE DFS ON HANDLING THE NEW FLOW. |
| DELETE | Y | N | H | N | Y | Y | - | NOTIFICATION FROM THE DFS TO THE CS THAT A FLOW WAS DELETED DUE TO INACTIVITY, EXPIRED TIMER, TCP CONNECTION CLOSE OR RESET. |
| REAP | N | Y | L | Y | N | N | STATS | NOTIFICATION FROM THE CS TO THE DFS TO DELETE A FLOW DUE TO EXPIRED TIMER. |
| STATS | Y | N | L | Y | Y | Y | - | STATISTICS SENT FROM THE DFS TO THE CS, WHEN THE CS HAS REQUESTED A FLOW TO BE DELETED. |
| NEWFLOW | N | Y | L | N | N | Y | - | NOTIFICATION TO THE DFS FROM THE CS TO PREPARE TO HANDLE A NEW FLOW. |
| RESET | Y | Y | L | N | N | Y | ACK (CSMB) | DELETE ALL FLOWS. |

*FIG. 4*

TABLE II: MESSAGE FIELDS

| FIELD | LENGTH (OCTETS) | FIELD NAME |
|---|---|---|
| MESSAGE TYPE (SEE FIG. 4) | 1 | msg_type |
| GLOBAL SERIAL NUMBER | 2 | serial_global |
| SERIAL NUMBER IN THIS TYPE | 2 | serial_bytype |
| ORIGINAL SOURCE IP ADDRESS | 4 | orig_src_ipaddr |
| ORIGINAL SOURCE TCP OR UDP PORT | 2 | orig_src_port |
| ORIGINAL DESTINATION IP ADDRESS | 4 | orig_dst_ipaddr |
| ORIGINAL DESTINATION TCP OR UDP PORT | 2 | orig_dst_port |
| NEW DESTINATION IP ADDRESS | 4 | new_dst_ipaddr |
| NEW DESTINATION TCP OR UDP PORT | 2 | new_dst_port |
| NEXT HOP IP ADDRESS | 4 | next_hop_ipaddr |
| TCP SERVER SEQUENCE NUMBER OFFSET | 4 | svr_seq_offset |
| TCP SERVER ACKNOWLEDGMENT NUMBER OFFSET | 4 | svr_ack_offset |
| TCP CLIENT SEQUENCE NUMBER OFFSET | 4 | client_seq_offset |
| TCP CLIENT ACKNOWLEDGMENT NUMBER OFFSET | 4 | client_ack_offset |
| FLAGS (SEE FIG. | 1 | flags |
| TCP FLAGS | 1 | tcp_flags |
| TYPE OF SERVICE | 1 | tos |
| PROTOCOL | 1 | proto |
| ERROR CODE | 1 | error |
| APPLICATION DATA LENGTH | 2 | app_data_len |
| APPLICATION-SPECIFIC DATA | (VARIES) | app_data |
| DFS VENDOR ID | 4 | vendor_id |
| FREE TEST STRING | (VARIES) | - |

*FIG. 5*

TABLE III: MESSAGE CONTENTS

| FIELDS | QUERY | APP_QUERY | REPLY | DELETE | REAP | STATS | NEWFLOW | RESET |
|---|---|---|---|---|---|---|---|---|
| app_data_len | N | Y | N | N | N | N | N | N |
| app_data | N | Y | N | N | N | N | N | N |
| error | N | N | Y | N | N | Y | N | N |
| proto | Y | Y | Y | Y | Y | Y | Y | N |
| tos | Y | Y | Y | Y | Y | Y | Y | N |
| tcp_flags | Y | Y | Y | Y | Y | Y | Y | N |
| flags | N | N | Y | Y | Y | Y | Y | N |
| svr_seq_offset, svr_ack_offset, client_seq_offset, client_ack_offset | N | N | Y | Y | Y | Y | Y | N |
| next_hop_ipaddr | N | N | Y | Y | Y | Y | Y | N |
| new_dst_port | N | N | Y | Y | Y | Y | Y | N |
| new_dst_ipaddr | N | N | Y | Y | Y | Y | Y | N |
| orig_src_ipaddr | Y | Y | Y | Y | Y | Y | Y | N |
| orig_dst_port | Y | Y | Y | Y | Y | Y | Y | N |
| orig_dst_ipaddr | Y | Y | Y | Y | Y | Y | Y | N |
| orig_src_port | Y | Y | Y | Y | Y | Y | Y | N |

FIG. 6

FLAGS FIELD BOOLEAN VARIABLES

| VARIABLE | EXPLANATION |
|---|---|
| OUTBOUND | IF TRUE, THEN THE MESSAGE IS REGARDING AN OUTBOUND FLOW. IF FALSE, THEN THE MESSAGE IS REGARDING AN INBOUND FLOW. MOST MESSAGES ARE INBOUND FLOWS. |
| ADD_TCP_OFFSET | IF TRUE, THEN THE VALUES OF THE seq_offset AND ack_offset FIELDS SHOULD BE ARITHMETICALLY ADDED TO THE APPROPRIATE VALUES IN THE TCP HEADER OF EVERY PACKET IN THE FLOW. THIS IS TYPICALLY USED WHEN THE TCP HANDSHAKE PROXY IS PERFORMED BY THE CS. IF FALSE, THEN THOSE FIELDS SHOULD BE IGNORED. |

*FIG. 7*

ERROR CODES FOR THE ERROR FIELD

| VALUE | EXPLANATION |
|---|---|
| UNKNOWN | THE CS DOES NOT KNOW HOW TO HANDLE THE FLOW IN THE QUERY. |
| NOTAVAIL | CS REPLY TO QUERY MESSAGE. THE VIRTUAL SERVER IS NOT AVAILABLE DUE TO PORT DENIED OR MAINTENANCE MODE. THE FLOW IS DENIED. |
| CONNLIMIT | CS REPLY TO QUERY MESSAGE. A USER DEFINED CONNECTION LIMIT FOR A VIRTUAL SERVER WOULD HAVE BEEN EXCEEDED. THE FLOW IS DENIED. |
| CONNALIVE | DFS STATS REPLY TO SSMB REAP MESSAGE. THE CONNECTION IS STILL ALIVE AND SHOULD NOT BE REAPED ON THE CS. STATISTICS SHOULD BE INCREMENTED ON THE CS. |

*FIG. 8*

SSMB Message Header

| 0 | 1 | 2 | 3 | 4 | 5 | 6 | 7 |
|---|---|---|---|---|---|---|---|
| flow serial (4) | | | | msg_type | count | error_code (2) | |

Flow Messages

| 0 | 1 | 2 | 3 | 4 | 5 | 6 | 7 |
|---|---|---|---|---|---|---|---|
| SSMB Header (8) | | | | | | | |
| orig_src_ipaddr (4) | | | | orig_dst_ipaddr (4) | | | |
| orig_src_port (2) | | orig_dst_port (2) | | tos | proto | flags | tcp_flags |
| new_dst_ipaddr (4) | | | | new_dst_port (2) | | pad (2) | |
| next_hop_ipaddr (4) | | | | svr_seq_offset (4) | | | |
| svr_ack_offset (4) | | | | client_seq_offset (4) | | | |
| client_ack_offset (4) | | | | flow_id (4) | | | |

Application Proxy Query Message

| 0 | 1 | 2 | 3 | 4 | 5 | 6 | 7 |
|---|---|---|---|---|---|---|---|
| SSMB Header (8) | | | | | | | |
| orig_src_ipaddr (4) | | | | orig_dst_ipaddr (4) | | | |
| orig_src_port (2) | | orig_dst_port (2) | | tos | proto | flags | tcp_flags |
| new_dst_ipaddr (4) | | | | new_dst_port (2) | | pad (2) | |
| next_hop_ipaddr (4) | | | | flow_id (4) | | | |
| pad (2) | | app_data_len (2) | | app_data (app_data_len) | | | |

Endflow Messages

| 0 | 1 | 2 | 3 | 4 | 5 | 6 | 7 |
|---|---|---|---|---|---|---|---|
| SSMB Header (8) | | | | | | | |
| orig_src_ipaddr (4) | | | | orig_dst_ipaddr (4) | | | |
| orig_src_port (2) | | orig_dst_port (2) | | tos | proto | flags | tcp_flags |
| inbound_bytes (8) | | | | | | | |
| outbound_bytes (8) | | | | | | | |
| inbound_pkts (8) | | | | | | | |
| outbound_pkts (8) | | | | | | | |
| flow_id (4) | | | | | | | |

*FIG. 9*

TABLE IV: MESSAGE TYPES

| MNEMONIC | DFS SENDS? | CS SENDS? | EXPECTED RESPONSE | EXPLANATION |
|---|---|---|---|---|
| ADD_VS | N | Y | - | ADD OR MODIFY A VIRTUAL SERVER. |
| DELETE_VS | N | Y | - | DELETE VIRTUAL SERVER. IF THE VIRTUAL SERVER DOES NOT EXIST, THE MESSAGE IS IGNORED. |
| QUERY_VS | Y | Y | VS_LIST | SEND LIST OF ALL VIRTUAL SERVERS. |
| VS_LIST | Y | Y | - | LIST OF CURRENTLY CONFIGURED VIRTUAL SERVERS. |
| RESET | Y | Y | - | DELETE ALL VIRTUAL SERVERS. TYPICALLY SENT BY THE CS WHEN IT INITIALIZES. |
| STATUS | Y | Y | STATUS | MISCELLANEOUS HOUSEKEEPING FUNCTIONS |
| HELLO | Y | Y | ACK | MISCELLANEOUS HOUSEKEEPING FUNCTIONS |
| ACK | Y | Y | - | MISCELLANEOUS HOUSEKEEPING FUNCTIONS |

*FIG. 10*

TABLE V: MESSAGE FIELDS

| FIELD | LENGTH (OCTETS) | FIELD NAME |
|---|---|---|
| MESSAGE TYPE (SEE FIG. 10) | 1 | msg_type |
| GLOBAL SERIAL NUMBER | 2 | serial_global |
| SERIAL NUMBER IN THIS TYPE | 2 | serial_bytype |
| MESSAGE LENGTH (IN BYTES, INCLUDING PAYLOAD DATA BUT NOT TCP OR LOWER-LAYER HEADERS) | 4 | msg_length |
| MAJOR VERSION NUMBER | 1 | vers_major |
| MINOR VERSION NUMBER | 1 | vers_minor |
| VIRTUAL IP ADDRESS | 4 | virt_ipaddr |
| VIRTUAL TCP OR UDP PORT | 2 | virt_port |
| PROTOCOL | 1 | proto |
| VIRTUAL SERVER CLASS | 1 | vs_class |
| FLAGS | 4 | flags |
| ERROR CODE | 1 | error |
| SSMB IP ADDRESS FOR ACTIVE CS | 4 | ssmb_active_ippadr |
| SSMB ID ADDRESS FOR STANDBY CS | 4 | ssmb_standby_ipaddr |
| SSMB UDP PORT | 2 | ssmb_port |
| APPLICATION CONFIGURATION DATA (HTTP COOKIE NAME, ETC.) | (VARIES) | app_data |
| APPLICATION SPECIFIC DATA LENGTH IN BYTES | 2 | app_data_len |
| FREE TEXT STRING | (VARIES) | - |

*FIG. 11*

TABLE VI: MESSAGE CONTENTS

| MESSAGE TYPE | FIELDS | | | | | | | | | | | | | |
|---|---|---|---|---|---|---|---|---|---|---|---|---|---|---|
| | vers_major, vers_minor | virt_ipaddr | virt_port | proto | vs_class | flags | error | proto | app_data | app_data_len | ssmb_active_ipaddr | ssmb_standby_ipaddr | ssmb_port | auth_data | auth_data_len |
| ADD_VS | N | Y | Y | Y | Y | Y | N | Y | Y | Y | N | N | N | N | N |
| DELETE_VS | N | Y | Y | Y | N | N | N | N | N | N | N | N | N | N | N |
| QUERY_VS | N | Y | Y | Y | N | N | N | N | N | N | N | N | N | N | N |
| VS_LIST | N | Y | Y | Y | Y | Y | N | Y | Y | Y | N | N | N | N | N |
| RESET | N | N | Y | N | N | N | N | N | N | N | N | N | N | N | N |
| STATUS | - | - | - | - | - | - | - | - | - | - | - | - | - | - | - |
| HELLO | Y | N | N | N | N | Y | N | N | N | N | Y | Y | Y | N | N |
| ACK | - | - | - | - | - | - | - | - | - | - | - | - | - | - | - |

*FIG. 12*

VIRTUAL SERVER CLASSES

| VARIABLE | EXPLANATION |
|---|---|
| CS_ASSIST | A CS-ASSISTED VIRTUAL SERVER. |
| DFS_ASSIST | A DFS-ASSISTED VIRTUAL SERVER. |

*FIG. 13*

CSMB Header

| 0 | 1 | 2 | 3 | 4 | 5 | 6 | 7 |
|---|---|---|---|---|---|---|---|
| global_serial (2) | | msg_type_serial (2) | | msg_length (4) | | | |
| msg_type | pad | error_code (2) | | | | | |

Virtual Server Definition

| 0 | 1 | 2 | 3 | 4 | 5 | 6 | 7 |
|---|---|---|---|---|---|---|---|
| flags (4) | | | | virt_ipaddr (4) | | | |
| virt_port (2) | | vs_class | proto | pad (2) | | app_data_len (2) | |
| app_data (app_data_len) | | | | | | | |
| | | | | | | | |

Hello Message

| 0 | 1 | 2 | 3 | 4 | 5 | 6 | 7 |
|---|---|---|---|---|---|---|---|
| CSMB Header (12) | | | | | | | |
| | | | | sssmb_active_ipaddr (4) | | | |
| ssmb_standby_ipaddr (4) | | | | flags (4) | | | |
| vers_major | vers_major | ssmb_port (2) | | | | | |

Virtual Server Definition

| 0 | 1 | 2 | 3 | 4 | 5 | 6 | 7 |
|---|---|---|---|---|---|---|---|
| flags (4) | | | | virt_ipaddr (4) | | | |
| virt_port (2) | | vs_class | proto | pad (2) | | app_data_len (2) | |
| app_data (app_data_len) | | | | | | | |
| | | | | | | | |

Status Messages

| 0 | 1 | 2 | 3 | 4 | 5 | 6 | 7 |
|---|---|---|---|---|---|---|---|
| CSMB HEADER (12) | | | | | | | |
| | | | | status (4) | | | |

*FIG. 14*

FLAGS FIELD BOOLEAN VARIABLES

| VARIABLE | EXPLANATION |
|---|---|
| TRANSLATE_ADDR | IF TRUE, THEN THE CS WILL ALWAYS SUPPLY A NEW DESTINATION IP ADDRESS FOR EACH FLOW. IF FALSE, THEN THE DFS SHOULD NOT TRANSLATE SOURCE OR DESTINATION IP ADDRESSES FOR ANY FLOW ON THIS VIRTUAL SERVER, AND THE DFS SHOULD ALWAYS IGNORE THE new_dst_ipaddr FIELD OF THE REPLY MESSAGE FROM THE CS. |
| TRANSLATE_PORT | IF TRUE, THEN THE CS WILL ALWAYS SUPPLY A NEW DESTINATION TCP OR UDP PORT FOR EACH FLOW. IF FALSE, THEN THE DFS SHOULD NOT TRANSLATE SOURCE OR DESTINATION PORTS FOR ANY FLOW ON THIS VIRTUAL SERVER, AND THE DFS SHOULD ALWAYS IGNORE THE new_dst_port FIELD OF THE REPLY MESSAGE FROM THE CS. |
| ROUTE_BY_DST_IP | IF TRUE, THEN THE DFS WILL PERFORM A ROUTE LOOKUP ON THE DESTINATION IP ADDRESS TO DETERMINE THE NEXT HOP ROUTE FOR THE FLOW. IF FALSE, THEN THE DFS WILL USE THE next_hop_ipaddr FIELD TO DETERMINE THE NEXT HOP FOR THE FLOW. |
| REDUNDANT | (HELLO MESSAGE) IF TRUE, THEN THERE ARE TWO CSs AND THE ssmb_standby_ipaddr WILL BE USED FOR STATE SHARING. IF FALSE, THEN EITHER THE CS IS NOT REDUNDANT OR STATE SHARING IS NOT DESIRED. |
| WILDCARD_ADDR | IF TRUE, THEN THE virt_ipaddr FIELD IS IGNORED AND ALL TRAFFIC RECEIVED FROM THE EXTERNAL NETWORK DESTINED FOR ANY ADDRESS WHICH DOES NOT MATCH ANOTHER VIRTUAL SERVER OR OTHER KNOWN LOCAL ADDRESS IS PROCESSED AS IF IT WAS ADDRESSED TO THIS VIRTUAL SERVER. |
| WILDCARD_PORT | IF TRUE, THEN THE virt_port FIELD IS IGNORED AND ALL TRAFFIC DESTINED FOR THIS VIRTUAL ADDRESS THAT DOES NOT MATCH ANOTHER VIRTUAL PORT OF ANY OTHER VIRTUAL SERVER IS PROCESSED AS IF IT WAS ADDRESSED TO THIS VIRTUAL SERVER. |
| NOARP_MODE | IF TRUE, THEN THE CONTROLLER ACTS LIKE A ROUTER AND ACCEPTS PACKETS DESTINED TO THIS ADDRESS BUT DOES NOT RESPOND TO ARP REQUESTS FOR IT. IF FALSE, THEN THE CONTROLLER ACTS AS A HOST AND ADVERTISES THE ADDRESS (I.E. RESPONSE TO ARP REQUESTS). |
| APP_PROXY | (HELLO MESSAGE) IF TRUE, THEN THE CONTROLLER SUPPORTS APPLICATION DATA LOAD BALANCING AND CAN PERFORM THE TCP HANDSHAKE PROXY AS WELL AS EXTRACT APPLICATION DATA FROM THE CLIENT REQUEST. THE CS ALWAYS SETS THIS FLAG TO TRUE. THE DFS SETS THIS FLAG TO TRUE IF IT HAS SUFFICIENT CAPABILITY. |
| SSL_PROXY | IF TRUE, THE CS MAKES LOAD BALANCING DECISIONS FOR THE VIRTUAL SERVER BASED UPON THE CLIENT'S SSL SESSION ID AND SENDS IT TO THE CS. |
| COOKIE_PROXY | IF TRUE, THE CS MAKES LOAD BALANCING DECISIONS FOR THE VIRTUAL SERVER BASED UPON THE VALUE OF A COOKIE IN THE HTTP REQUEST. THE DFS SHOULD PROXY THE CLIENT CONNECTION, EXTRACT THE DESIGNATED COOKIE, AND SEND THE COOKIE TO THE CS. THE COOKIE NAME IS PROVIDED IN THE app_data FIELD. |
| HTTP_PROXY | IF TRUE, THE CS MAKES LOAD BALANCING DECISIONS FOR THE VIRTUAL SERVER BASED UPON THE VALUE OF THE HTTP REQUEST. THE DFS SHOULD PROXY THE CLIENT CONNECTION, EXTRACT THE HTTP REQUEST, AND SEND THE DATA TO THE CS. |
| RAW_PROXY | IF TRUE, THE CS MAKES LOAD BALANCING DECISION FOR THE VIRTUAL SERVER BASED UPON THE APPLICATION DATA FORMAT THAT IS NOT SUPPORTED BY THE DFS. THE DFS SHOULD PROXY THE CLIENT CONNECTION, AND BRIDGE PACKETS THAT ARE RECEIVED FROM THE CLIENT TO THE CS. |

*FIG. 15*

ERROR CODES FOR THE ERROR FIELD

| VALUE | EXPLANATION |
|---|---|
| VERS_NEW | THE VERSION SPECIFIED IN THE HELLO MESSAGE IS NOT YET SUPPORTED BY THIS SEGMENT. THE OTHER SEGMENT SHOULD SEND ANOTHER HELLO MESSAGE WITH A LOWER VERSION NUMBER, IF POSSIBLE. |
| VERS_OBSOLETE | THE VERSION SPECIFIED IN THE HELLO MESSAGE IS NO LONGER SUPPORTED BY THIS SEGMENT. THE OTHER SEGMENT SHOULD SEND ANOTHER HELLO MESSAGE WITH A HIGHER VERSION NUMBER, IF POSSIBLE. |

*FIG. 16*

SIMPLIFIED METHOD FOR PROCESSING MULTIPLE CONNECTIONS FROM THE SAME CLIENT

CROSS-REFERENCE TO RELATED APPLICATIONS

This application is a divisional of U.S. patent application Ser. No. 10/150,422, filed May 17, 2002, which is a continuation-in-part of U.S. patent application Ser. No. 09/814,415, filed Mar. 21, 2001, now issued as U.S. Pat. No. 7,343,413, which claims the benefit of U.S. Patent Application No. 60/191,019, filed May 21, 2000. The '422, '415, and '019 applications are each hereby incorporated by reference herein in their entirety.

FIELD OF THE INVENTION

The present invention relates to connection management in a communication system. More specifically, the present invention relates to reusing connection information that is associated with a client up to "N" times such that connections to between the client and the server are set up in an accelerated manner.

BACKGROUND OF THE INVENTION

Local area networks (LANs), which were once merely a desirable technology available to share common network resources, are now an integral part of any information technology (IT) infrastructure. Moreover, the concept of the LAN has expanded to the wide area network (WAN), where remote offices and databases are made available to LAN clients as through they are connected to the same LAN. More recently, virtual private networks (VPN) have been utilized to allow a private intranet to be securely extended across the Internet or other network service, facilitating secure e-commerce and extranet connections with partners, suppliers and customers. The evolution of global networking has rapidly advanced networking topologies.

LAN segments are routinely connected together using a bridge device. The bridge device allowed the two network segments to share traffic despite differences in the network topologies. For Example, a Token Ring network and an Ethernet network can share network traffic using a bridge device.

Routers became popular to couple one LAN to another LAN or WAN. Routers store data packets from one LAN and forward those data packets to another LAN or WAN. The need for faster communication resulted in the development of the high-speed switch, also referred to as a layer 2/3 switch. High-speed switches move data packets across a network to an end user.

When client-server networks first emerged, servers were generally placed close to their clients. As the applications delivered over networks became more advanced, the servers increased in complexity and capacity. Moreover, applications that ran over these networks such as e-mail, intranet web sites, and Internet gateways, became indispensably pervasive. Supporting these services became critically important, and proved far too complex when servers were widely distributed within the enterprise. As a result, it has become a standard practice to consolidate such resources into server arrays.

A Server array controller is an Internet traffic management device. Server array controllers (hereinafter referred to simply a "controller" or "controllers") control the flow of data packets in and out of an array of application servers. The controller manages and distributes Internet, intranet and other user requests across redundant arrays of network servers, regardless of the platform type. Controllers support a wide variety of network applications such as web browsing, e-mail, telephony, streaming multimedia and other Internet protocol (IP) traffic.

Although advances in data communication technology have dramatically improved the transmission speeds, many problems still exist. Application availability can still be threatened by content failure, software failure or server failure. System resources are often out of balance, with low-performance resources receiving more user requests than high-performance resources being underutilized. Internet Traffic Management (ITM) products are computer systems that sit in the network and process network traffic streams. ITM products switch and otherwise respond to incoming requests by directing them to one of the servers.

A more complete appreciation of the invention and its improvements can be obtained by reference to the accompanying drawings, which are briefly summarized below, to the following detail description of presently preferred embodiments of the invention, and to the appended claims.

SUMMARY OF THE INVENTION

In accordance with the invention, an apparatus is related to connection management for a communications network. A control component receives a data flow requesting a resource from a client, identifies the client, and determines when the data flow is unassociated with a connection to a requested resource. The control component selects a new content server for an unassociated resource request when: the identified client was previously unknown, the identified client has exceeded a maximum number of connections with a previously selected content server, or the cached load balance decision associated with the identified client has expired. The control component selects the previously selected content server when the identified client has not exceeded the maximum number of connections and the cached load balance decision has not expired. A switch component is employed to maintain a connection between the client and the selected content server such that the client receives the requested resource. Utilizing cached connection information for up to "N" connections decreases system latency, and reduces the work that is required by the controller for traffic management.

In accordance with one aspect, an apparatus is related to communications over a network between a client and at least one content server. A control component is arranged to receive a resource request from the client, select a new content server when the control component determines that at least one determined condition exists, and select a previously selected content server when the at least one determined condition fails to exist. The determined conditions include the client is unassociated with another content server, and the client is associated with another content server that is maintaining a maximum number of resource requests associated with the client. A switch component is arranged to direct a data flow between the client and the selected content server such that the selected content server provides the requested resource to the client over the network.

In accordance with another aspect, a method is related to directing communications over a network between a client and at least one content server. A data flow is received that includes a resource request. The client that is associated with the resource request is identified. A new content server is selected to handle the resource request when at least one determined condition occurs. The determined conditions include the client is unassociated with another content server, and the client is associated with another content server that is maintaining a maximum number of resource requests associated with the client. A previously selected content server is selected when the client that is associated with resource request is associated with the previously selected content server, and the previously selected content server is maintaining less than the maximum number of resource requests with the client. The data flow is detected between the selected content server and the client.

In accordance with still another aspect, an apparatus is related to directing communications over a network between a client and at least one content server. A means for receiving a data flow is arranged to receive a data flow that includes a resource request. A means for identifying the client is arranged to identify a client that is associated with the resource request. A means for selecting a new content server is arranged to select a new content server to handle the resource request when at least one determined condition occurs. The determined conditions include the client is unassociated with another content server, and the client is associated with another content server that is maintaining a maximum number of resource requests associated with the client. A means for selecting a previously selected content server is arranged to select a previously selected content server when the client that is associated with resource request is associated with the previously selected content server, and the previously selected content server is maintaining less than the maximum number of resource requests with the client. A means for directing the data flow is arranged to direct the data flow between the selected content server and the client.

The present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 4 is a table of mnemonics used in an exemplary controller;

FIG. 5 is a chart showing message fields used in an exemplary controller;

FIG. 6 is a table showing message contents used in an exemplary controller;

FIG. 7 is a chart showing Boolean variables used in an exemplary controller;

FIG. 8 is a chart showing error codes used in an exemplary controller;

FIG. 9 is a diagram of formatted message packets using the message fields and variables shown in FIGS. 5 and 6;

FIG. 10 is another table of mnemonics used in an exemplary controller;

FIG. 11 is another chart showing message fields used in an exemplary controller;

FIG. 12 is another table showing message contents used in an exemplary controller;

FIG. 13 is a chart describing server classes in an exemplary controller;

FIG. 14 is a diagram of formatted message packets using the message fields and variables shown in FIGS. 10 and 11;

FIG. 15 is another chart of Boolean variables used in an exemplary controller;

FIG. 16 is another chart of error codes used in an exemplary controller;

DETAILED DESCRIPTION OF THE PREFERRED EMBODIMENT

An embodiment of the invention relates to a cache-type connection management scheme. A server array controller may be configured to utilize the cache-type connection management scheme. In one example, the server array controller is a load-balancing server array controller such as, for example, a BIG-IP® server array controller that is manufactured by F5 Networks, Incorporated. In another example, the server array controller is segmented into hardware-optimized and software-optimized portions. The server array controller (controller) performs load-balancing and other traffic control functions. An illustration of a server array controller and a segmented server array controller that are in accordance with the present invention is shown in FIG. 1 and FIG. 1B.

The server array controllers (hereinafter referred to simply as a "controller") shown in FIGS. 1 and 1B include one or more network interfaces, and perform the operations of routing, translating, and switching packets. Although the controllers shown in FIGS. 1 and 1B include internal and external network connections, a single network connection is also within the scope of the present invention. The controller maintains the state of each flow of packets. The controller dynamically selects operations on "flows" based on the content of the packets in the flow. A flow is a sequence of packets that have the same flow signature.

Figure 1:
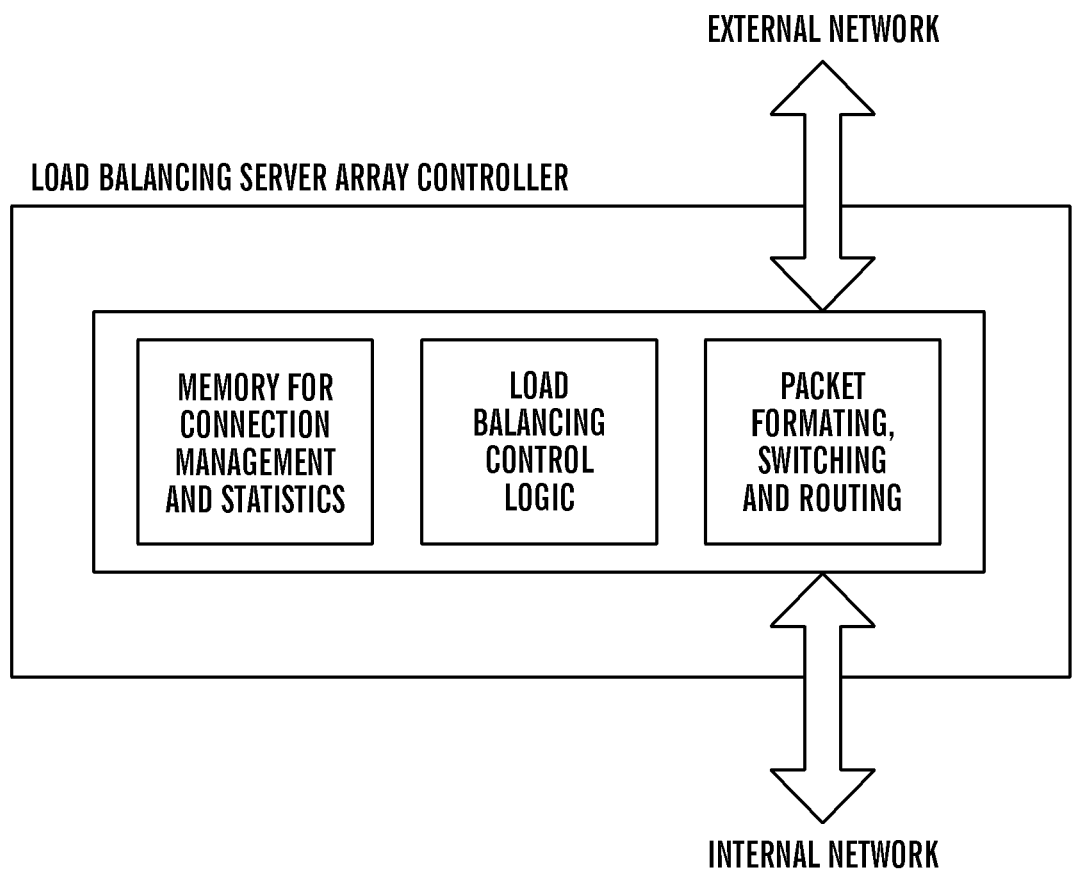
FIG. 1 is a system diagram of an exemplary load-balancing server array controller.
Figure 1B:
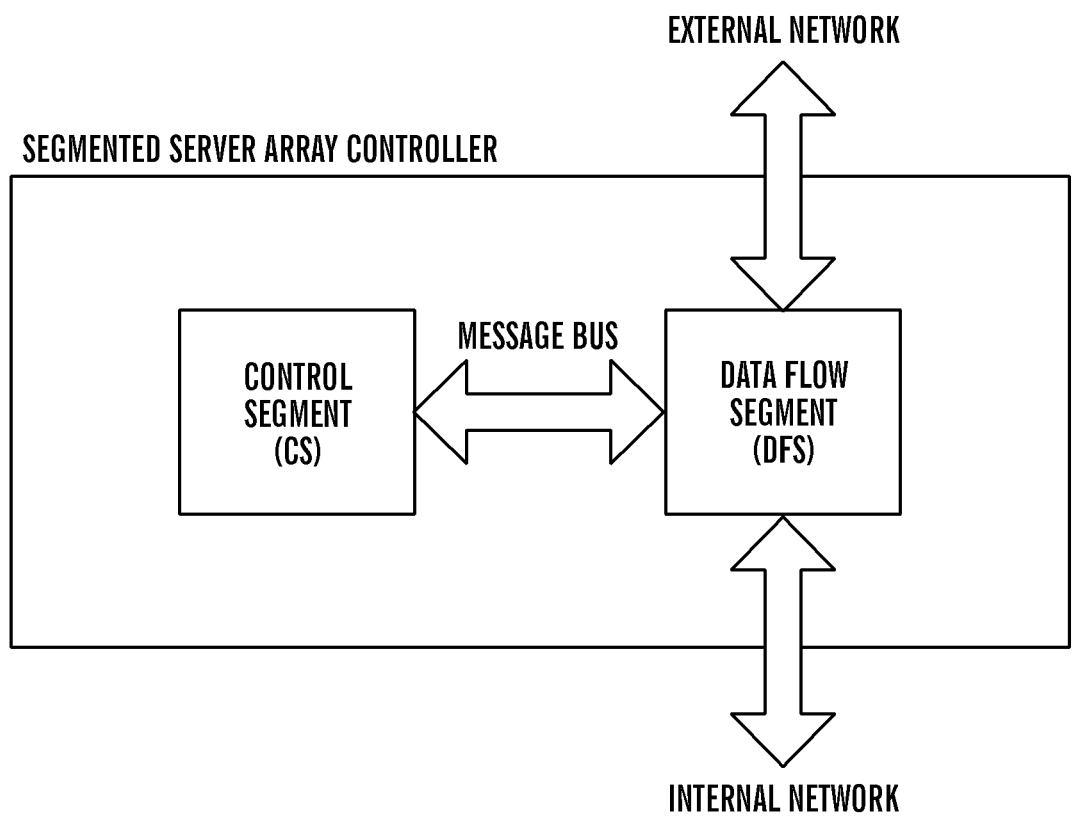
FIG. 1B is a system diagram of an exemplary segmented server array controller.

In one example of the invention, the controller is a load-balancing server array controller as illustrated in FIG. 1. The controller includes a load-balancing and control logic that may be implemented in software, hardware, or a combination of software and hardware. The control logic utilities a memory to store flow tables, statistical data, as well as other controller information. Also, a switching means is employed to perform packet formatting and switching/routing as configured and controlled by the control logic. The control logic performs various tasks such as statistical calculations, and controlling the routing, switching, and translations on each flow of packets. The control logic also performs high-level control functions such as per-flow policy enforcement, load-balancing calculations, and network address translation (NAT).

Figure 2:
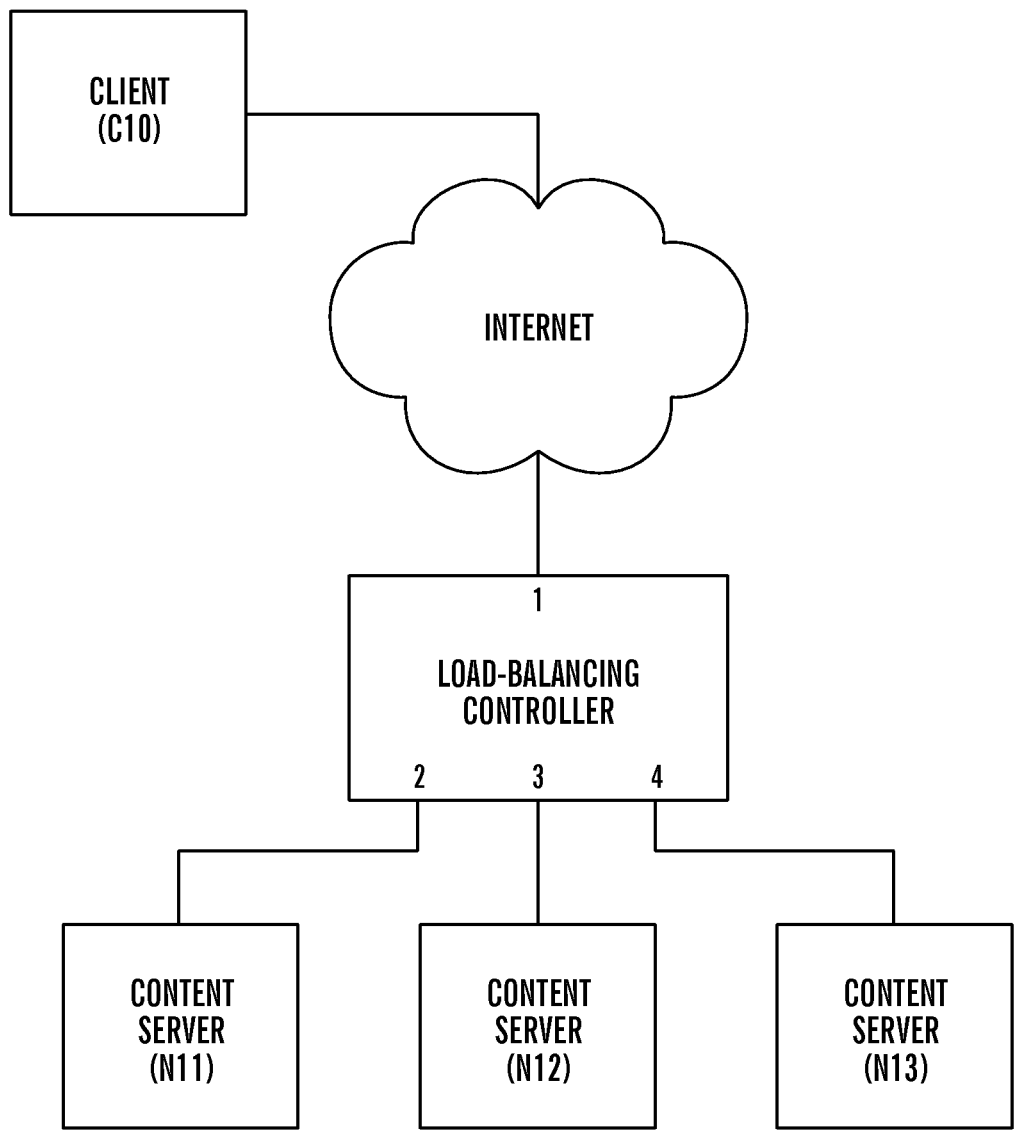
FIG. 2 is a system diagram of an exemplary controller including connection to a client and server.

An example configuration of a load-balancing controller is shown in FIG. 2. As shown in FIG. 2, a client (C10) is connected to an input port (1) of a load-balancing controller through the Internet (external network). Content servers (N11, N12, N13) are connected to ports 2, 3 and 4. The content servers are behind the controller on the internal network.

In another example of the invention, the controller is a segmented server array controller that includes a Data Flow Segment (DFS) and at least one Control Segment (CS) as shown in FIG. 1B. The DFS includes the hardware-optimized portion of the controller, while the CS includes the software-optimized portions. The DFS performs most of the repetitive chores including statistics gathering and per-packet policy enforcement (e.g. packet switching). The DFS may also perform tasks such as that of a router, a switch, or a routing switch. The CS determines the translation to be performed on each flow of packets, and thus performs high-level control functions and per-flow policy enforcement. Network address translation (NAT) is performed by the combined operation of the CS and DFS.

Any number of control segments may be coupled to the DFS over the message bus (see FIG. 1B). Typically, there is a primary CS and a secondary (or redundant) CS. Multiple control segments allow for load sharing between the control segments. In addition, fault tolerance is provided for since the primary CS can go out of service while the secondary CS assumes the role of the primary control segment. An example configuration with two control segments is shown in FIG. 2B.

Figure 2B:
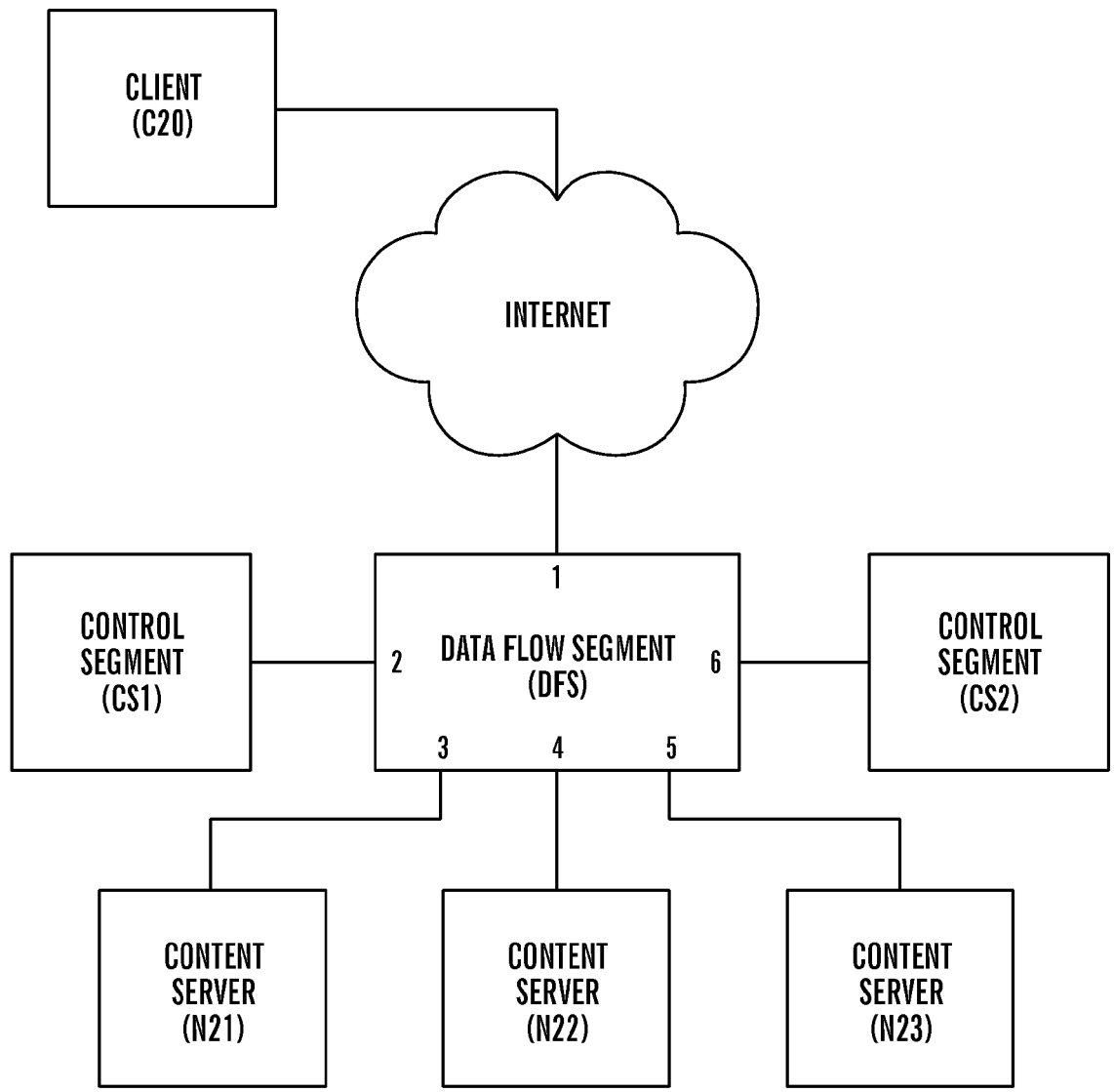
FIG. 2B is a system diagram of an exemplary partitioned controller including connections to a client and server.

As shown in FIG. 2B, a client (C20) is connected to an input port (1) of a data flow segment (DFS) through the Internet (external network). A first control segment (CS1) is connected to the DFS through ports 2 and 3 (INT and EXT). A second control segment (CS2) is connected to the DFS through ports 7 and 8 (INT and EXT). Content servers (N21, N22, N23) are connected to ports 4, 5 and 6. The content servers are behind the controller on the internal network.

The controller includes at least one connection to a network that can be external or internal. An external network connection is typically to the client-side of the network. The external network is said to be "in front of" the controller. An internal network connection is typically to the server-side of the network, which may include routers firewalls, caches, servers and other devices. The internal network is said to be "behind" the controller. Network address translation (NAT) normally occurs between the internal and external networks.

A client communicates from the external network to the internal network through the controller. For example, in FIG. 1B the DFS communicates with the various control segments (CSs) for instructions on new flows. The CSs can access the networks that are connected to the DFS. The networks that are connected to the DFS may be of any type such as, for example, Fast Ethernet and Gigabit Ethernet. Administration and state sharing (if applicable) are provided over the messaging bus by either the internal or external interfaces (or both). Although the controllers in FIGS. 1 and 1B are shown requiring two ports (EXT and INT), it is understood and appreciated that a single port connection will serve equally well.

The controllers categorize packets into flows, where each flow has a unique flow signature. A flow signature is a tuple including information about the source and destination of the packets. In one example, the flow signature is a sextuple of source IP address, source port number, destination IP address, destination port number, protocol, and type-of-service packets in a flow. A flow exists for a finite period. Subsequent flows may have the same flow signature as a previously received flow.

New flows are identified based on their flow signature and matched with a virtual server. A virtual server is an IP address and TCP/UDP port combination (the actual server is referred to as a "node"). The controller accepts a request from the virtual server and load balances those requests to servers situated behind the controller. Virtual servers are established by either the load-balancing controller (see FIG. 1) or by the CS and communicated to the DFS via the message bus (see FIG. 1B). Either the controller in FIG. 1, or the DFS in FIG. 1B attempts to match the destination address and port number of packets received from the external network to a virtual server.

Translation is performed on each packet in each flow based on the flow signature. Translation is a set of rules that control which parts of a packet are to be rewritten, and the values that those parts will be rewritten to. The controller receives Packets from both internal and external networks. After the packets are received, the controller categorizes the packets into flows, analyzes the flow signature, and looks up the rules for that flow signature in a table (or another suitable data construct). The IP address of the flow is analyzed if the flow signature does not appear in the table. The rules for another flow in the table are reused for up to "N" flows that have the same client IP address. Reusing the connection data "N" times results in increased connection speeds for subsequent connection requests by the same client. "N" is any arbitrary integer that is greater than or equal to 1 (i.e., 1, 8, or 16, etc.). The load-balancing algorithm that is employed by the controller will average out the additional connections to the same servers over the long run.

Although the example partitioned controller shown in FIG. 2B includes two partitions, the segmented blocks may be incorporated into one or more separate blocks including, but not limited to, two segments in the same chassis. Each CS is a module that plugs into the DFS chassis, and the two segments are merely functional blocks in the same server array controller. The CS and DFS are independently scalable. In one example, multiple DFSs cooperate with a single CS. In another example, multiple CSs cooperate with a single DFS. Additionally, it is envisioned that the functionality of either the DFS or the CS may be separately implemented in software and/or hardware.

In one example, the DFS performs reception and analysis of the flow signatures. The DFS analyzes and determines when the IP address of the flow has been identified in another flow table entry. The DFS sends a query to the CS over the message bus for instructions when the IP address of the current flow either does not match an entry in the flow table, or when the flow table entry has exceeded the maximum number of allowed connections ("N"). The CS replies with instructions on handling the new flow, and the DFS makes a new rule entry in the table for the new flow signature. The DFS routes, switches or otherwise directs the flow based on the rules for the particular flow signature. Thus, the DFS has capabilities that are similar to that of a router, a switch, or a routing-switch.

The DFS also detects certain events that occur for each flow. When an event that falls into a particular category (e.g., open a new connection) is detected, a message is sent from the DFS to the CS. The CS immediately responds with a message that describes translations and switching to perform on the flow (if required). The operation of the DFS will become apparent from the discussion that follows below.

Overview of the Operation of the DFS

Figure 3:
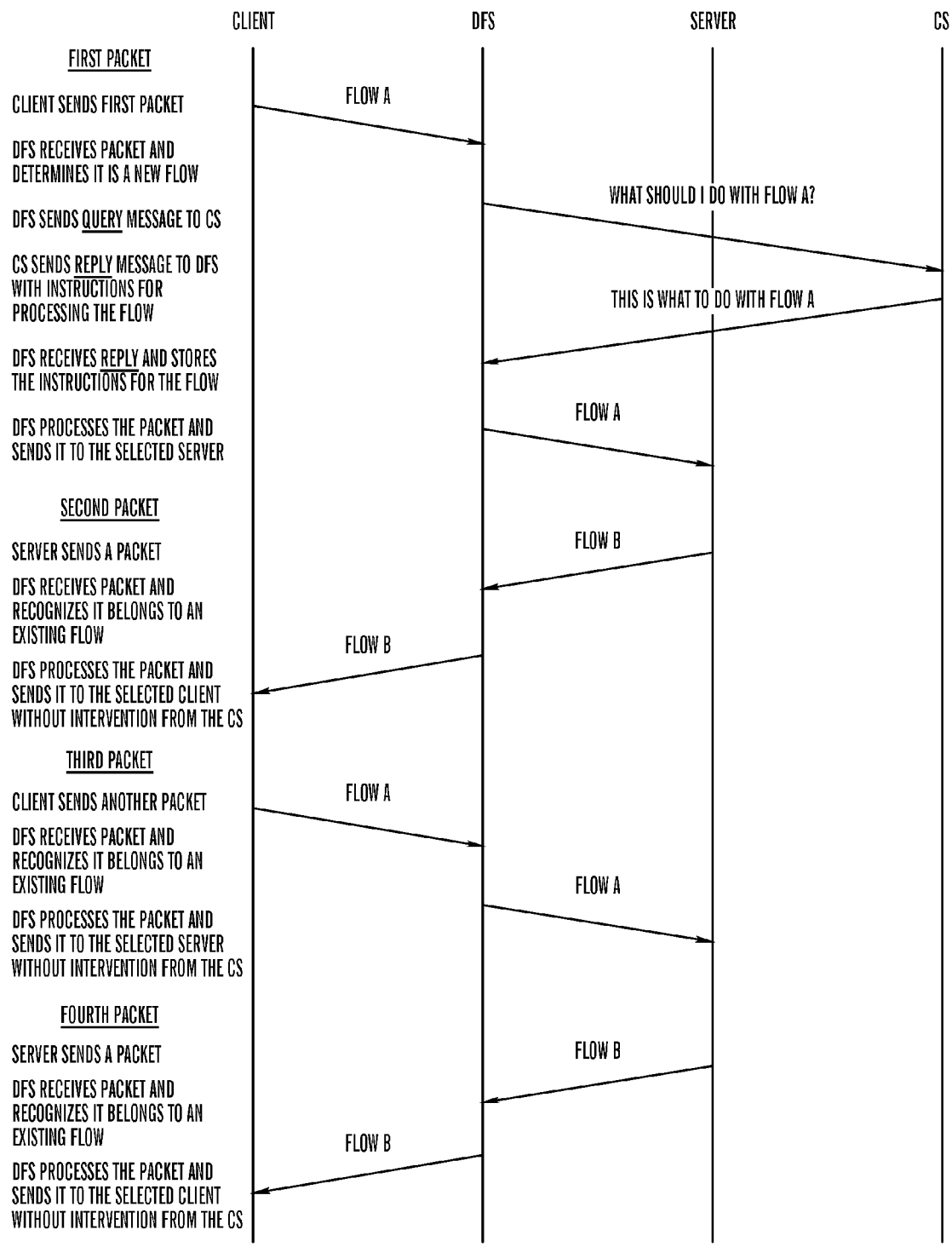
FIG. 3 is an exemplary diagram of packet flows from client to server in a controller.

FIG. 3 shows a conceptual operation of an example scenario in which a client and a server exchange sequences of packets with a segmented (partitioned) controller.

First, a client sends a first packet to the DFS. The DFS receives the packet and determines that the packet is not part of any flow currently being maintained. The DFS sends a message (QUERY) to the CS requesting instructions on how to handle the new flow (i.e., which server shall packets be routed to). The CS receives the message from the DFS, determines how to handle FLOW A, and sends a message (REPLY) to the DFS with instructions on how to handle the flow. The DFS receives the message (REPLY) from the CS and stores the instruction in a local memory (table, etc.). Then, the DFS begins to process the packets for FLOW A and send the processed packets to the selected server.

A set of packets is sent from the server to the client in response to the server receiving FLOW A (i.e., a handshake, acknowledge, etc.). The server sends the packets to the DFS. The DFS receives the packets from the server and recognizes the packets as belonging to a return flow (FLOW B) of an existing communication by FLOW A. The DFS processes the packets and sends the processed packets to the selected client without intervention by the CS.

The client sends another set of packets to the DFS. The DFS receives the packets immediately recognizes that the packets belong to an existing flow (FLOW A). The DFS processes the packets and sends the processed packets to the selected server without intervention by the CS.

After receiving packets corresponding to FLOW A, the server responds by sending packets to the DFS. The DFS receives the packets from the server and recognizes the packets as belonging to an existing flow (FLOW B). The DFS processes the packets and sends the processed packets to the selected client without intervention by the CS.

Figure 3B:
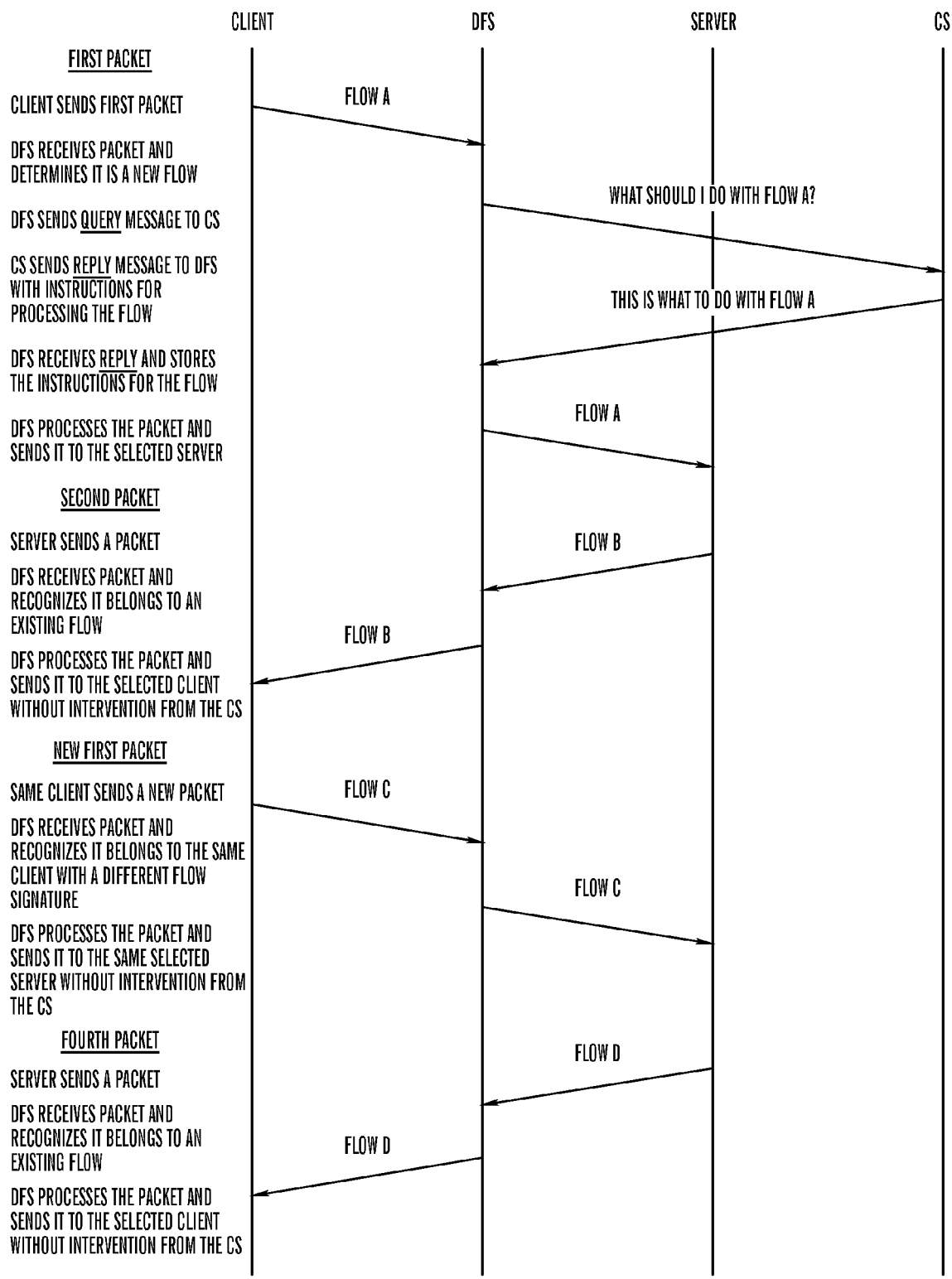
FIG. 3B is an exemplary diagram of packet flows from client to server in a partitioned controller.

FIG. 3B shows another conceptual operation of an example scenario in which a client and a server exchange sequences of packets with a segmented (partitioned) controller.

First, a client sends a first packet to the DFS. The DFS receives the packet and determines that the packet is not part of any flow currently being maintained. The DFS sends a message (QUERY) to the CS requesting instructions on how to handle the new flow (i.e., which server shall packets be routed to). The CS receives the message from the DFS, determines how to handle FLOW A, and sends a message (REPLY) to the DFS with instructions on how to handle the flow. The DFS receives the message (REPLY) from the CS and stores the instruction in a local memory (table, etc.). Then, the DFS begins to process the packets for FLOW A and send the processed packets to the selected server.

A set of packets is sent from the server to the client in response to the server receiving FLOW A (i.e., a handshake, acknowledge, etc.). The server sends the packets to the DFS. The DFS receives the packets from the server and recognizes the packets as belonging to a return flow (FLOW B) of an existing communication by FLOW A. The DFS processes the packets and sends the processed packets to the selected client without intervention by the CS.

The client sends another set of packets to the DFS. The DFS receives the packets immediately recognizes that the packets are part of a new flow (i.e., FLOW C) for a client that is identified in an existing flow table entry (i.e., FLOW A). The DFS processes the packets and sends the processed packets to the selected server without intervention by the CS.

After receiving packets corresponding to FLOW C, the server responds by sending packets to the DFS. The DFS receives the packets from the server and recognizes the packets as belonging to an existing flow (FLOW D). The DFS processes the packets and sends the processed packets to the selected client without intervention by the CS.

The present invention may be implemented with varying wire protocols. Each wire protocol defines a communication protocol for message exchanges between the DFS and the CS (or multiple CSs). Although two different wire protocols are discussed below, any other suitable wire protocol is considered within the scope of the present invention.

SSMB Wire Protocol (Real Time Configuration Protocol)

In one example of the present invention, the messaging bus is structured as a state-sharing message bus (SSMB). The SSMB operates in real-time, has extremely low latency, and high bandwidth. Since the total latency of the controller includes the round-trip latency of the SSMB interface, it is important that the SSMB have low latency and a high bandwidth to provide adequate real-time operation. The SSMB bus structure is useful for systems where the DFS actively sends and receives messages to/from the CS (or multiple CS).

In one embodiment, the SSMB is layered on top of UDP. All message types fit into one UDP data-gram. Also, all message types should fit within on MAC frame to avoid IP fragmentation and reassembly.

The flow of messages from CS to DFS is asynchronous and independent of the flow of messages from the DFS to CS. Reply messages are initiated in response to query messages. The request and replies from the DFS and CS need not be interleaved. The querying segment should not be idle while waiting for a reply. The querying segment should not waste time trying to associate received replies with queries. Instead, reply messages should be self-contained so that the receiving segment will process the reply without needing to know what the original query was.

Each message contains a serial number (or other indicator) that is generated by the originator of the flow. The originator of the flow is the first party to query or notify the other party regarding the flow. The serial number remains constant for all messages pertaining to the flow during the flow's lifetime. Since the DFS is typically the first party to detect an inbound flow (from the external network to the internal network), the DFS is generally the originator of the flow. In this case, the DFS sends a message (QUERY) to the CS to notify the CS about the new flow. In some instances (e.g. CS-assisted flow), the CS originates the flow by sending a message (NEW-FLOW) to the DFS.

In one example of the present invention, message types are defined as depicted in table I shown in FIG. 4. A "Y" entry in the "DFS Sends?" column indicates that the message is sent from the DFS to the CS (or multiple CSs). A "Y" in the "CS Sends?" column indicates that the message is sent from the CS to DFS. An "H" priority indicates a time critical message, usually because the latency of packets in a flow is proportional to the time for the message and it's reply. An "L" priority indicates that the message is not a time-critical message. A "Y" in the "Batching?" column indicates that the information portion of the message may be combined with other messages such that the messages are sent as a batch. A "Y" in the "Single mbuf?" column indicates that the message is required to fit in a single memory buffer of the DFS or CS as is applicable. A "Y" in the "State Sharing" column indicates that the message is to be replicated to the standby CS (or multiple CSs) if there is one. The "Expected Response" column indicates the type of message that is expected in response to the current message.

FIG. 5 shows a table (table II) listing the data elements that are expected to be sent in a given message. Each message type may consist of a predefined subset of these data elements. The length of the message is derived from the UDP header.

FIG. 6 shows a table (table III) of message fields for the message types defined in FIG. 4. After having read the present disclosure, it is understood and appreciated that other message types and message fields may also be utilized within the scope of this invention. The message layout is optimized for efficient processing by the CS and according to the needs of the particular DFS. Every message has a message header that includes msg_type, error_code, and message serial number fields. Example message layouts are shown in FIG. 9.

FIG. 7 shows a table of exemplary boolean variables that are packed into the flags field shown in FIG. 6. The OUTBOUND variable determines if a message concerns an inbound flow or an outbound flow (TRUE=outbound, FALSE=inbound). The majority of messages are regarding inbound flows. The ADD_TCP_OFFSETS variable determines if the TCP packet is to be offset or not (TRUE=offset TCP packet, FALSE=do not offset TCP packet). When an offset is to be added to the TCP packet, the seq_offset and ack_offset variables are used to determine the amount of offset to be added to the values found in the TCP header. TCP packets are often offset when the TCP handshake proxy is performed by the CS.

FIG. 8 shows a table of exemplary error codes that are used in the error field shown in FIG. 6. A code of UNKNOWN indicates that the CS does not know how to handle a particular flow. A code of NOTAVAIL indicates that the virtual server that was requested in a QUERY message by the DFS is not available because either the port requested was denied or the virtual server is in maintenance mode. A CONNLIMIT error code indicates that the requested connection (in a QUERY from the DFS) would exceed the maximum available connections to the virtual server. A CONNALIVE error code indicating that a flow subject to a SSMB REAP message (requesting deletion of a flow) from the CS is still active. The DFS sends a STATS message with this error field set to request the CS to increase the statistics on the flow.

When a redundant CS topology is used, one CS is the primary (active) controller, and the remaining CS (or multiple CSs) is a backup or standby controller. The standby CS receives copies of all state information originating in the active CS. Specifically, the standby CS needs to receive a copy of any state information message that is communicated by the active CS to the DFS so that all of the CSs share common state information. Exemplary state information messages are shown in FIG. 6.

The DFS is designed to facilitate shared state information across multiple control segments (CSs) using any appropriate communication method including, but not limited to, IP multicasting and artificial packet replication.

An IP multicast message joins all control segments (CSs) and the DFS into a common IP multicast group. The active CS sends all state information messages as multicast messages. The DFS receives the multicast message, replicates the message, and sends the replicated message to all members of the IP multicast group. All other non-multicast messages are pointcast on a separate non-multicast address.

For certain DFS implementations, an artificial packet replication method is simpler to implement than IP multicast messaging. The effect of artificial packet replication is the same as multicast in that the DFS creates a replica of the received state information and forwards a copy of the state information to the standby control segment(s). However, the active CS is not required to send the information to the DFS as a multicast message as in the IP multicast message method.

The CS will not respond to an SSMB message unless the DFS has correctly responded to an authentication challenge. The format for an authentication message is shown in FIG. 6 and FIG. 9. Authentication will be discussed in further detail as follows below in this specification.

CSMB Wire Protocol

Another type of messaging bus structure is a configuration sharing message bus (CSMB). The CSMB works in concert with the SSMB Wire Protocol. The CSMB does not need to operate in real-time. In one example, the CSMB is layered on top of TCP. One or both of the network connections between the CS and the DFS carry the protocol.

The DFS passively monitors the message bus. The CS actively makes connections, while the DFS accepts connections. The CS automatically connects whenever it detects that it is not already connected. The DFS supports simultaneous connections between the DFS and multiple control segments (CSs).

Whenever a new connection is established the CS (or multiple CSs) and the DFS send HELLO messages (e.g. see FIG. 10) to one another prior to any other message types. The CS will also periodically send a HELLO message to the DFS to validate the connection. The CS configures the time interval between the transmissions of HELLO messages.

The CSMB wire protocol provides for an asynchronous flow of messages from the CS (or multiple CSs) to the DFS. The flow of messages from the CS to the DFS is independent of the flow of messages from DFS to CS. Reply messages are initiated in response to query messages. The requests and replies from the DFS and CS need not be interleaved. The querying segment should not be idle while waiting for a reply. The querying segment does not waste time trying to associate received replies with queries. Instead, reply messages are self-contained so that the receiving segment will process the reply without needing to know what the original query was.

Each message contains a serial number (or other indicator) that is global for all messages, and a serial number that is specific to messages of the specific type. In one embodiment the serial numbers are unsigned 16-bit integers.

According to one embodiment of the invention, message types are defined in a table (table IV) as shown in FIG. 10. A "Y" entry in the "DFS Sends?" column indicates that the message is sent from the DFS to the CS (or multiple CS). A "Y" in the "CS Sends?" column indicates that the message is sent from the CS to DFS. The "Expected Response" column indicates the type of message that is expected in response to the current message.

FIG. 11 is a table (table V) listing data elements that are expected to be sent in a given message. Each message type may consist of a predefined subset of these data elements. The length of the message is derived from the UDP header.

FIG. 12 shows a table (table VI) of message fields for the message types defined in FIG. 10. It is understood and appreciated that other message types and message fields may also be utilized within the scope of this invention. The message layout is optimized for efficient processing by the CS and according to the needs of the particular DFS. Every message has a message header that includes msg_type, serial_global, serial_bytype and msg_length fields. Example message layouts are shown in FIG. 14.

Version number fields (vers_major, vers_minor) apply to both CSMB and SSMB wire protocols. In the HELLO messages (see FIGS. 12 and 14), the CS and DFS attempt to negotiate the highest numbered version that is supported by both.

Two different virtual server classes are supported, a CS-assisted virtual server and a DFS-assisted virtual server (see FIG. 13). Virtual servers that do not require application data load-balancing are of the class DFS_ASSIST. The DFS-assisted virtual server has no special flag settings in the ADD_VS and VS_LIST messages.

As discussed previously, virtual servers (defined as an IP address and TCP/UDP port combination) are established by the CS and communicated to the DFS via the message bus. For CSMB wire protocol, the CS is configured to automatically inform the DFS of each deletion and addition of virtual servers.

The controller accepts a request from the virtual server (sometimes referred to as a "node") and load balances those requests to servers situated behind the controller. The DFS attempts to match the destination address and port number of packets received from the external network to a virtual server.

In one embodiment of the invention, the DFS performs TCP handshake proxy (also referred to as TCP splicing) for certain types of virtual servers, and also extracts application specific data from the client request. The DFS sends a message to the CS that includes the extracted data (SSMB APP_QUERY, see FIGS. 6 and 9). Virtual servers that are supported according to this embodiment are of the class DFS_ASSIST. These virtual servers are specified using the ADD_VS and VS_LIST messages (see FIGS. 10, 12 and 14). Setting the flags for SSL_PROXY, HTTP_PROXY, specifies the DFS_ASSIST type virtual servers or COOKIE_PROXY, as will be discussed later.

In another embodiment of the invention, the DFS does not have the capability to extract application data from the client request because it is an unsupported application protocol. In this instance, the DFS will perform the TCP handshake proxy with the client and forward (bridge) a copy of the client packets to the CS (or multiple CSs). Virtual servers that are supported according to this embodiment are of the class DFS_ASSIST. These virtual servers are specified using the ADD_VS and VS_LIST messages (see FIGS. 10, 12 and 14). Setting the flags field to RAW_PROXY (discussed later) specifies the DFS_ASSIST type for unsupported application protocols.

Virtual servers may also be of the class CS_ASSIST, where the CS routes all packets in a flow that are related to a specific CS assisted virtual server. In this instance, the DFS bridges all packets to and from the CS, and state or configuration data is not exchanged between the DFS and the CS. The CS_ASSIST class of virtual servers is used when the DFS is incapable of performing the TCP handshake proxy. The CS_ASSIST class of virtual servers is also used when the DFS is incapable of assuming a flow from the CS using a hybrid CS assisted virtual server.

A hybrid CS assisted virtual server is used in conjunction with the TCP handshake proxy. Flows begin as CS_ASSIST and then switch over to DFS_ASSIST after the TCP handshake proxy is complete and a message (NEWFLOW) is received from the CS. For TCP flows, the DFS adds the sequence number and ack offsets received in the NEWFLOW message to all the packets received in the flow.

FIG. 15 shows a table of exemplary Boolean variables that are packed into the flags field shown in FIG. 12. The TRANSLATE_ADDR variable determines if the DFS will provide address translation functions for an incoming flow (TRUE=translate, FALSE=do not translate). The TRANSLATE_PORT variable determines if the DFS will provide port translation functions for an incoming flow (TRUE=translate, FALSE=do not translate). The ROUTE_BY_DST_IP variable determines if the DFS will perform a route address lookup (TRUE) or if the DFS will use the next_hop_ipaddr field to determine the next hop for the flow (FALSE).

The REDUNDANT and APP_PROXY variables are part of the HELLO message. When REDUNDANT is set to TRUE, multiple CSs are used and the ssmb_standby_ipaddr is used for state sharing. When state sharing is not used or multiple CSs are not used, the REDUNDANT variable is set to FALSE. When the WILDCARD_ADDR variable is set to TRUE, the virt_ipaddr field is ignored and all traffic received from the external network that is destined for any address that does not match another virtual server or other known local address is processed as if it was addressed to this virtual server. When the WILDCARD_PORT variable is set to TRUE, the virt_port field is ignored and all traffic received that is destined for any virtual port that does not match the virtual port of any other virtual server is processed as if it was addressed to this virtual server. If the NOARP_MODE is set to TRUE then the controller acts like a router and accepts packets destined to the address but does not respond to ARP requests for the address. When NOARP_MODE is set to FALSE, the controller acts as a host and advertises the address (e.g., responds to ARP requests). When APP_PROXY is set to TRUE, the controller supports application data load-balancing, and can perform the TCP handshake proxy as well as extract application data from the client request. The CS typically sets APP_PROXY to TRUE. The DFS set APP_PROXY to TRUE if the DFS has sufficient capability to do so. If SSL_PROXY is set to TRUE then the CS makes load-balancing decision for the virtual server based upon the client's SSL session id. The DFS proxies the client connection, extracts the session id, and sends the session id to the CD. If COOKIE_PROXY is set to TRUE then the CS makes load-balancing decisions for the virtual server based upon the value of a cookie in the HTTP request. The DFS proxies the client connection, extracts the designated cookie, and send the cookie to the CS with the cookie name provided in the app_data field. If HTTP_PROXY is set to TRUE then the CS makes load-balancing decisions for the virtual server based upon the value of the HTTP request. The DFS proxies the client connection, extracts the HTTP request, and sends the data to the CS. If RAW_PROXY is set to TRUE then the CS makes load-balancing decisions based upon an application data format that is not supported by the DFS. The DFS proxies the client connection and bridges packets that are received from the client to the CS.

FIG. 16 shows a table of exemplary error codes that are used in the error field shown in FIG. 12. A code of VERS_NEW indicates that the particular segment does not yet support the version specified in the HELLO message. If possible, the other segment should send another HELLO message with a lower version number. A code of VERS_OBSOLETE indicates that the particular segment no longer supports the version specified in the HELLO message. In this case, the other segment should send another HELLO message with a higher version number.

In one embodiment of the invention, CSMB messages are used to negotiate IP addresses and UDP port numbers for the SSMB wire protocol. CSMB may also be used to exchange configuration information such as the default gateway address and other administrative IP addresses. CSMB is also used to negotiate versions between the CS and DFS for both the SSMB and CSMB wire protocols.

The CS sends authentication challenges to the DFS using the CSMB wire protocol. The CS also sends other messages to the DFS such as the addition or deletion of each virtual server. The CS will not respond to a CSMB message from the DFS unless the DFS has correctly responded to an authentication challenge. The format for an authentication message is shown in FIG. 12 and FIG. 9. Authentication will be discussed in further detail as follows below in this specification.

Operational Description

The operational description that follows below regarding FIGS. 17-22 are described with respect to a segmented (partitioned) controller as in FIGS. 1B and 2B. However, the connection management for a (non-segmented) controller such as in FIGS. 1 and 2 are comparable to that described below. The operational features of the CS and DFS are combined in the (non-segmented) controller.

Operation of the DFS in SSMB Mode

Figure 17:
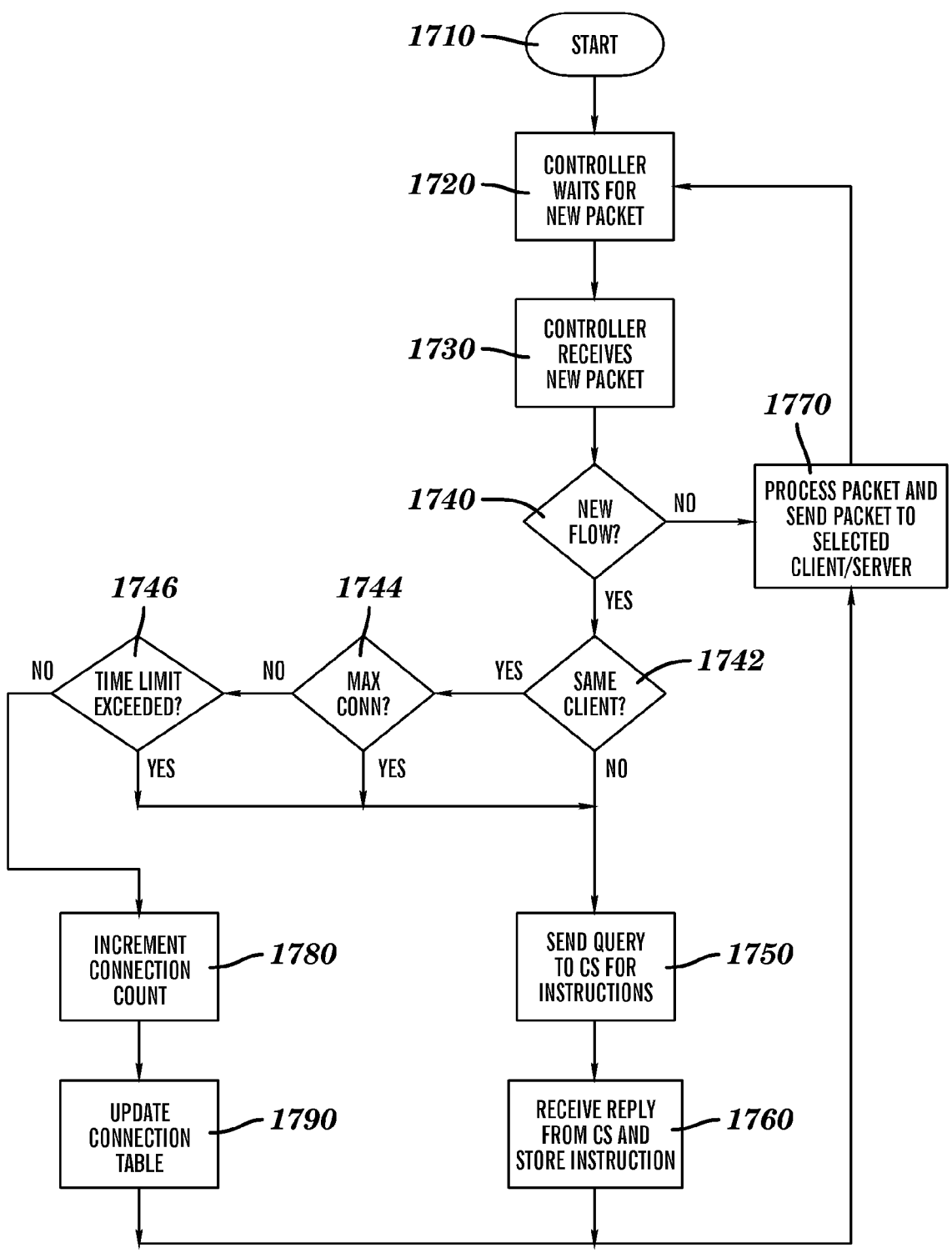
FIG. 17 is a flow chart of basic operations for a data flow segment (DFS) in an exemplary partitioned controller.

FIG. 17 shows a flow chart of the basic operation of the controller. In one embodiment, the controller is a segmented controller and the procedural flow for FIG. 17 is performed by the DFS. In another embodiment, the controller is a non-segmented controller and the functions identified in steps 1750 and 1760 are performed by the non-segmented controller.

Processing begins at start block 1710 and proceeds to block 1720 where the controller waits for the receipt of a new packet. When a new packet is received, processing proceeds to block 1730. Proceeding to block 1740, the controller analyzes the new packet (i.e., with the DFS in a segmented controller) to determine if the packet is part of a new flow.

When the incoming packet is part of an existing flow, processing proceeds from block 1740 to block 1770 where the incoming packet is processed and subsequently sent to the selected client or server as may be required. Processing then proceeds to block 1720 where the controller waits for the receipt of another packet.

Returning to decision block 1740, processing proceeds to decision block 1742 when the incoming packet is identified as part of a new flow. The client identifier(s) of incoming packet are analyzed at decision block 1742. Processing proceeds to block 1750 when a new client (i.e., one not in the current flow table) is identified in the incoming packet. Otherwise, processing proceeds from block 1742 to block 1744 when the client identified in the incoming packet is a previously identified client (i.e., a client found in the current flow table).

The total number of connections that is currently associated with a particular client is analyzed at decision block 1744. Processing continues at block 1750 when the maximum number of connections (i.e., MAXX CONN., "N") is exceeded. Otherwise, processing continues to decision block 1746 when the maximum number of connection (MAX CONN., "N") has not been exceeded.

Each cached connection decision may have an associated time stamp (or age) that is used to monitor the connection time between a client and a selected content server. Cached connection decisions may be aged such that they expire when the connection time associated with the cached connection time stamp exceeds a maximum time limit. At decision block 1746, the current connection time for the client is analyzed to determine if the maximum time limit has been exceeded. Processing continues to block 1750 when the connection time limit for the client is exceeded. Otherwise, processing continues to block 1780.

At block 1780, the current connection count that is associated with the identified client is incremented. Processing continues from block 1780 to block 1790, where the connection table information is updated. Processing flows from block 1790 to block 1770. At block 1770, the current packet is processed and forwarded to the selected client or server (as is required).

At block 1750 the DFS sends a message (QUERY) to the CS for instructions on handling the new flow. Processing then proceeds from block 1750 to block 1760 where the DFS receives an instruction from the CS (REPLY) on how to handle the new flow. The DFS then stores the instruction from the CS in a local memory area (i.e., a table). Once the DFS has stored the processing instructions, processing proceeds to block 1770 where incoming packets are processed and the packets are sent to the selected client or server (as is required).

In an alternative embodiment, blocks 1780 is replaced with a decrement connection count step. In this instance, the connection count is initialized to a maximum number of connections when a new table entry is created, and the decision block 1744 is arranged to compare the current connection count to a minimum number such as 0 or 1.

In one example, block 1790 is implemented by copying an existing flow table entry, amending the duplicate flow table entry based on the new flow signature, and adding the amended flow table entry to the existing flow table. In another example, the flow table entry has a specific field that is amended to indicate the new flow signature, such as by amending a list of ports associated with the identified client.

Although the processing is shown as sequential in FIG. 17, the controller continually receives packets in an asynchronous manner. For a segmented controller, the DFS continuously receives messages from the CS in an asynchronous manner. Since the controller is continually receiving packets and messages, the controller may not enter an idle state and continues processing messages and packets from a local memory buffer.

Flow Management

Figure 18:
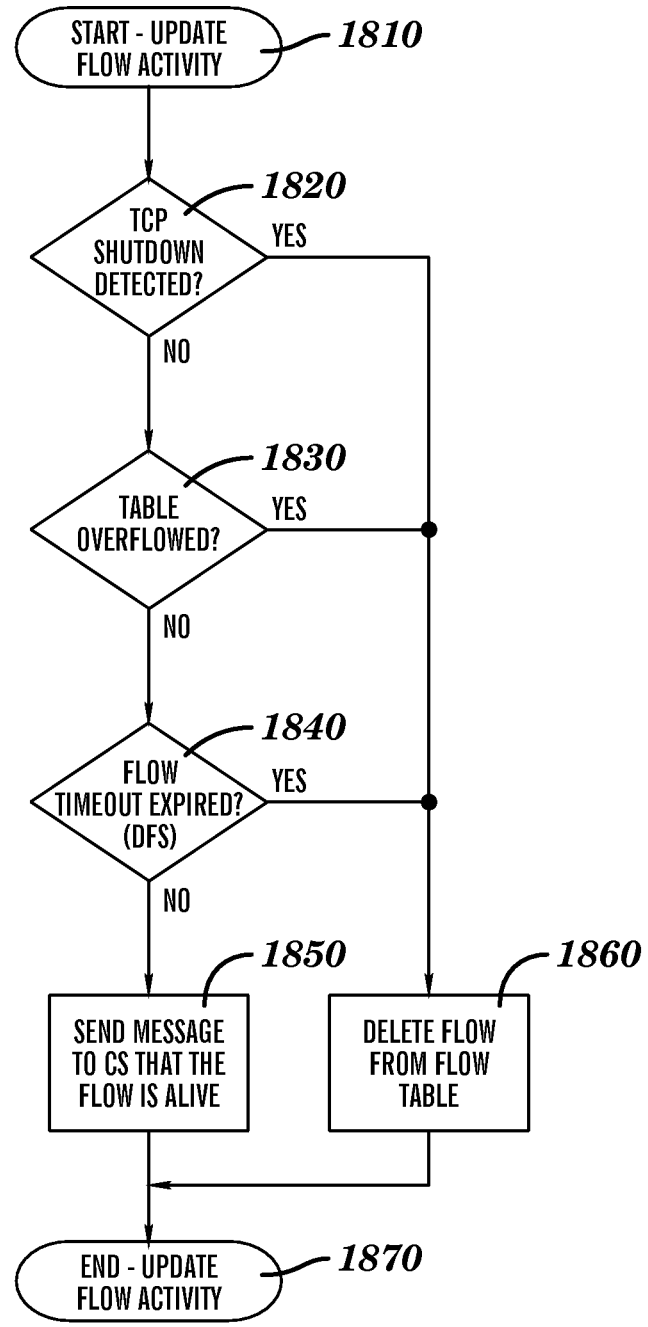
FIG. 18 is a flow chart of flow activity management for a data flow segment (DFS) in an exemplary partitioned controller.

As discussed previously flows have a finite lifetime. In a non-segmented controller, the controller maintains a memory of the flow activity (i.e., in a table). In a segmented controller, the DFS and CS have different notions concerning when an existing flow ends. The DFS and CS have independent creation and deletion of flows. An overview of the operation of the DFS procedure that is used to determine when a flow is alive is shown in FIG. 18.

Processing begins at start block 1810 and proceeds to decision block 1820. The controller DFS analyzes the flow at block 1820. Processing proceeds from block 1820 to block 1860 when a TCP shutdown (FIN or RST) is detected within the flow. At block 1860, the flow table entry that is associated with the current flow is deleted from the flow table. In one example of a non-segmented controller, the controller decrements the connection count associated with a particular client when the flow table entry is deleted. In another example of a non-segmented controller, the controller deletes the flow table entry associated with the flow without modifying the connection count such that the total number of connections associated with a particular client will have a limited persistence.

Processing flows from decision block 1820 to decision block 1830 when the DFS determines that the flow does not contain a TCP shutdown. At decision block 1830 the DFS analyzes the flow table (i.e., the DFS flow table in a segmented controller) to determine if an overflow has occurred. As discussed previously, the DFS (or the controller in a non-segmented controller) maintains a table that keeps track of each flow signature and rules for processing each flow. When the table no longer has enough room to accommodate additional entries, an overflow condition occurs. Processing proceeds from decision block 1830 to block 1860 where the flow is deleted when the overflow condition is detected.

Returning to decision block 1830, processing flows from decision block 1830 to decision block 1840 when the DFS determines that the flow table has not overflowed. At decision block 1840, the DFS determines if a flow timeout has occurred. Processing proceeds from decision block 1840 to block 1860 where the flow is deleted when the timeout condition is detected.

Returning to decision block 1840, processing flows from decision block 1840 to block 1850 when the DFS determines that the flow timeout has not occurred. At block 1850 the DFS (or the controller in a non-segmented controller) determines that the flow is still alive. From block 1850, processing proceeds to block 1870 where the flow management is complete. In one embodiment of the invention, the DFS sends a message to the CS to inform the CS that the flow is still active. In another embodiment of the invention, all messages that are sent from a particular CS are monitored by all CSs so that each CS may maintain duplicate table entries for fault tolerance.

As described above, the DFS (or the controller in a non-segmented controller) deletes flow table entries when: a normal TCP shutdown (FIN or RST) is detected within the flow, an overflow in the flow table occurs, or a timeout for the flow has expired. The DFS also deletes flows when the CS has sent a REAP or TIMEOUT message about the flow and the DFS does not consider the flow to be active.

Figure 19:
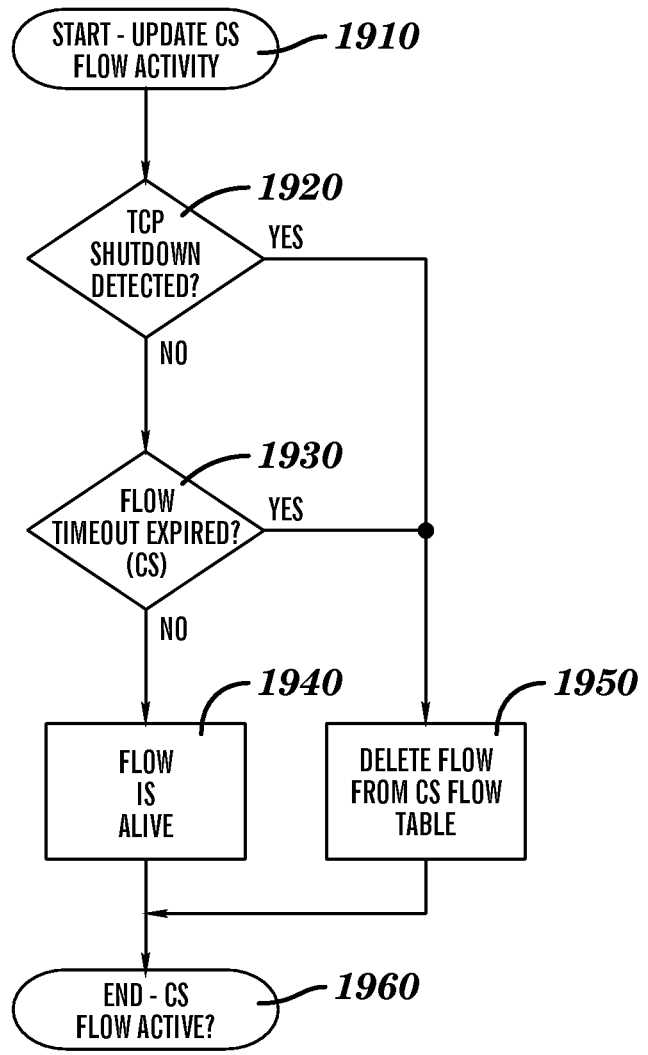
FIG. 19 is a flow chart of flow activity management for a control segment (CS) in an exemplary partitioned controller.

An overview of the operation of the CS procedure that is used to determine if a flow is still alive is shown in FIG. 19. Processing begins at start block 1910 and proceeds to decision block 1920 where the CS determines if a TCP shutdown (FIN or RST) is detected within the flow. When a TCP shutdown is detected within the flow, processing proceeds to block 1950 where the flow is deleted.

Returning to decision block 1920, when the CS determines that the flow does not contain a TCP shutdown and processing proceeds to decision block 1930 where the DFS determines if a flow timeout has occurred. When the timeout condition has occurred, processing proceeds from decision block 1930 to block 1950 where the flow is deleted. Otherwise, if no flow timeout has occurred, processing proceeds from decision block 1930 to block 1940 where the CS determines that the flow is active.

In one embodiment of the present invention, the CS sends a message to the DFS (e.g. REAP) when the CS has determined that a flow should be terminated due to inactivity. If the DFS determines that the flow is still active, the DFS sends a message (e.g. STATS) to the CS that includes an error code indicating the flow is still alive (e.g. CONNALIVE). When the CS receives the STATS message indicating a flow is active, the CS will not delete the flow and will reset the inactivity timer for the flow.

As discussed previously, the CS performs high-level control functions such as load-balancing based upon various statistics that are gathered by the controller. The CS also keeps track of statistics for each flow and determines when a particular flow has become inactive. A timer is associated with each flow and may be used to determine factors such as: most active flow, least active flow, time flow opened, most recent activity as well as other parameters related to flow statistics and load-balancing.

When a flow is detected as timed out, the CS sends a message to the DFS to delete the flow (e.g. REAP). The DFS sends a message that is responsive to the REAP indicating that either the flow is still active (e.g. STATS message with CONNALIVE set to true) or that the flow has been deleted. The CS maintains the flow as active while waiting for the response from the DFS. The CS will either delete the flow from the CS flow tables or reset the timer for the flow after receiving the message from the DFS.

A flow in the DFS may end before a TCP session ends. Consequently, the DFS may start a new flow for an existing TCP session and query the CS about it. The CS will be able to distinguish between a new DFS flow and a new TCP session by examining messages that are received from the DFS.

A new flow is detected when an event is detected by the DFS. Events that are detected by the DFS are communicated to the CS (or multiple CSs) via the message bus (e.g. SSMB). In one example, a TCP or UDP connection-open is detected by the DFS indicating the start of a new flow.

There are several different types connections that can be opened using TCP. Each type of connection results in an event that is detected by the DES, and requires a different response by the DFS. UDP flows are handled similar to TCP events. The various connection open/close types will be discussed as follows below.

TCP Connection Open, Non-Application Proxy DFS-Assisted Virtual Servers

When a TCP connection open is detected of this type, the DFS sends a message (QUERRY) to the CS that contains the source and destination IP addresses and port numbers. While the DFS awaits a reply from the CS, the DFS buffers all incoming packets in the flow (identified by its flow signature as described previously) until it receives instructions from the CS. The CS will respond to the QUERRY with a message (REPLY) describing translations to make for packets in that flow, and information that will be used to switch the flow.

TCP Connection Open, Application Proxy Virtual Servers

When a TCP connection open is detected of this type, the DFS performs a handshake with the client before proceeding. After a TCP handshake proxy is made with the client, the DFS buffers packets received from the client until the required data from the request is received. The DFS sends a message (e.g. APP_QUERY) to the CS that contains the source and destination IP addresses and ports as well as the application data from the client request. The CS will respond to the APP_QUERY with a REPLY message describing the translations to make for packets in that flow, and information that will be used to switch the flow. Once the REPLY is received from the CS, the DFS performs a handshake proxy with the server and establishes an outbound flow. The DFS continues to buffer all packets in the flow until the TCP handshake proxy with the server is completed, and the flow established.

TCP Connection Open, Raw Proxy Virtual Servers

When a TCP connection open is detected of this type, the DFS performs a handshake with the client before proceeding. After a TCP handshake proxy is made with the client, the DFS forwards (bridges) packets received from the client to the CS until the required amount of payload data is received. When the CS has received sufficient data to make a load-balancing decision, the CS will send a message (NEWFLOW) to the DFS describing the translations to make for the packets in the flow. Once the DFS receives the NEWFLOW message, the DFS performs the TCP handshake proxy with the server and establishes the outbound flow. The DFS continues to buffer all packets in the flow until the TCP handshake proxy with the server is completed, and the flow established.

TCP Connection Open, Hybrid CS-Assisted Virtual Servers

When a TCP connection open is detected of this type, the CS performs a handshake with the client and receives data from the client. The CS continues to receive data from the client until sufficient data is received to make a load-balancing decision. When the CS has made a load-balancing decision, the CS will perform a TCP handshake with the server and send a message (NEWFLOW) to the DFS describing the translations to make for the packets in the flow. Once the DFS receives the NEWFLOW message, the DFS will assume the flow, applying the TCP sequence number and offsets received in the NEWFLOW message, to the continuing packets in the flow.

TCP Connection Close

The DFS (or the non-segmented controller) keeps track of the TCP connection termination protocol for the flow (Application FIN, Server ACK, Server FIN, and Application ACK). The DFS should not delete a TCP flow when the flow is in the middle of state transition. When a TCP connection close (or reset) is detected, the DFS notifies the CS by sending a message (DELETE) to the CS. The DFS does not need to wait for a response from the CS and may stop tracking the flow. In a system that includes statistics gathering mechanisms in the DFS, the DFS will include the statistics for the flow in the DELETE message.

DFS Message Processing

Figure 20:
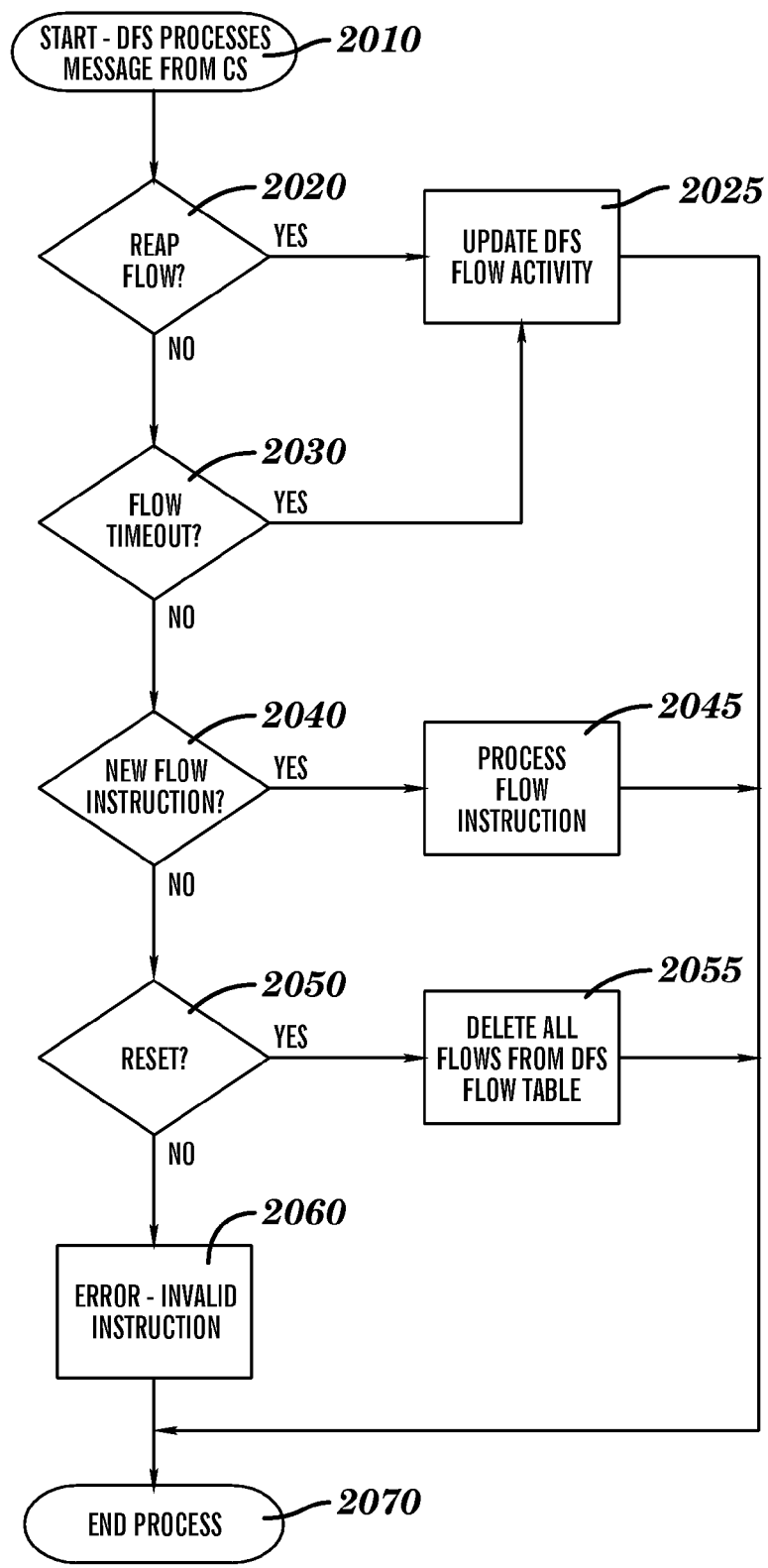
FIG. 20 is a flow chart of message processing for a data flow segment (DFS) in an exemplary partitioned controller.

Messages received by the DFS from the CS are generally described as shown in FIG. 20. Processing begins at start block 2010 and proceeds to block 2020 where the DFS begins parsing the received message. When the message (e.g. REAP FLOW) from the CS is to delete a particular flow (as specified in the message), processing proceeds to block 2025, where the DFS updates the DFS tables based on flow activity (refer to the previous discussion of FIG. 18). After the DFS flow activity is updated (either the flow is still alive, or deleted from the DFS table), processing is complete and processing ends at block 2080.

Returning to block 2020, processing proceeds to block 2030 when the received message is a message other than deleting a particular flow. At decision block 2030, the DFS determines if the received message indicates a particular flow has timed out. When the message received from the CS indicates that the particular flow has timed out, processing proceeds to block 2025, where the DFS updates the DFS flow tables based upon the activity of the particular flow. Processing proceeds from block 2030 to block 2040 when the message received from the CS indicates that the message is not a flow timeout.

At decision block 2040, the DFS determines if the received message indicates a new flow is to be set up. When the message indicates a new flow, processing proceeds to block 2045 where the new flow is processed. As discussed previously, new flows are processed in accordance with routing/switching instructions that are provided by the CS, and entered into the DFS flow tables accordingly. When the message is parsed as a message other than a new flow, processing proceeds from block 2040 to block 2050.

At decision block 2050, the DFS determines if the received message indicates to reset the system. When the system is to be reset, processing proceeds from decision block 2050 to block 2055 where all flows are deleted from the DFS flow tables. When the message does not indicate a system reset, processing proceeds from block 2050 to block 2060.

At block 2060, the DFS determines that an invalid message has been received. Alternatively, the DFS may process other message types as may be required in a particular application. From block 2060, processing proceeds to block 2070 where processing is completed. Processing also proceeds to block 2070 from blocks 2025, 2045, and 2055.

Exemplary Flow Processing

Figure 21:
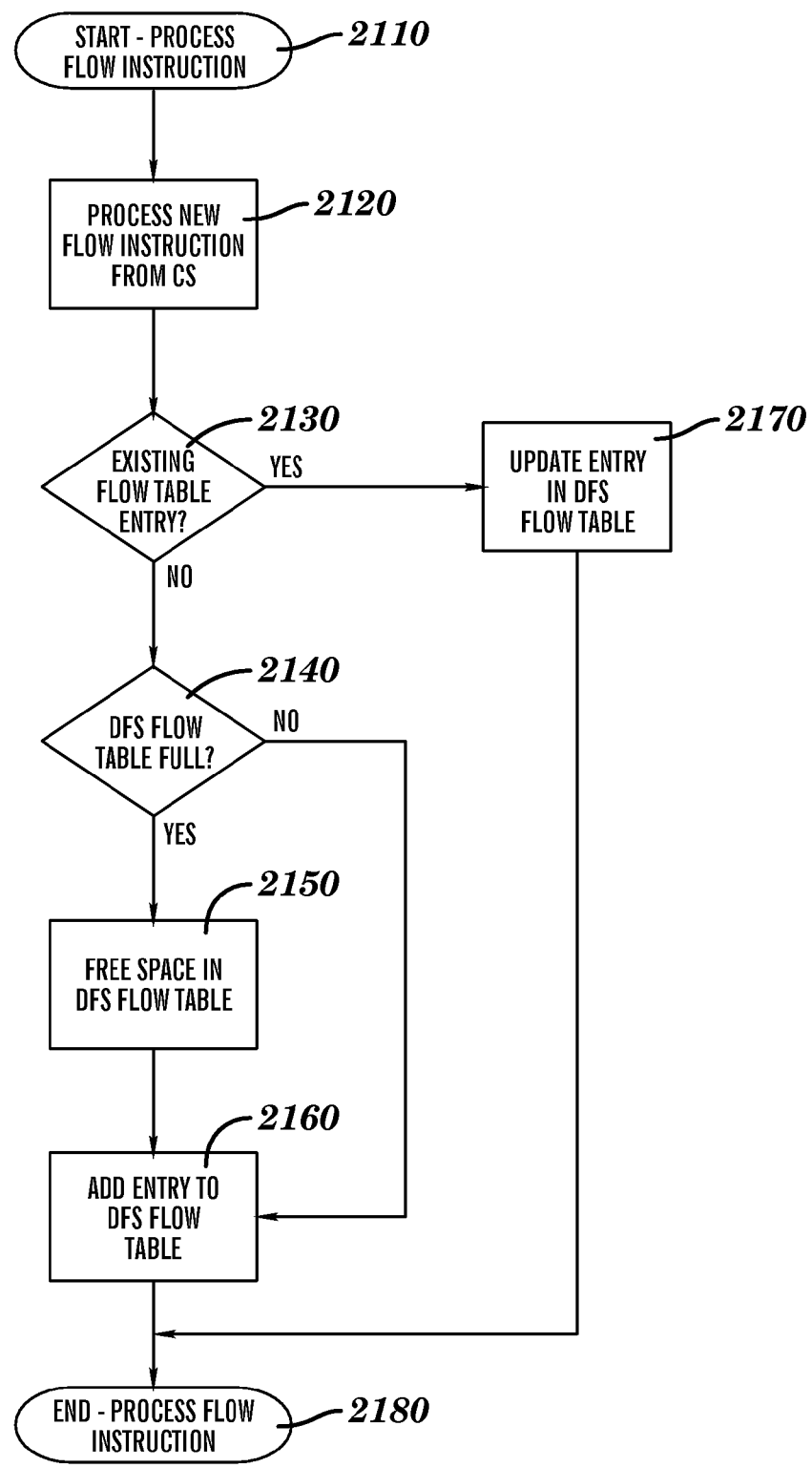
FIG. 21 is a flow chart of new flow management for a data flow segment (DFS) in an exemplary partitioned controller.

An example procedure for new flow processing (e.g., block 2045 in FIG. 20) is shown in FIG. 21. Although the flow processing is described with reference to a segmented controller, the below described procedure may be employed by a non-segmented controller as described above with reference to FIGS. 1 and 2.

Processing begins at start block 2110 and proceeds to block 2120 where the DFS (or the non-segmented controller) begins to parse the new flow instruction from the received CS message. The new flow has a corresponding flow signature, destination, source as well as any other relevant routing or switching information that is described by the CS in the received message. After the relevant information is extracted from the received message, processing flows from block 2120 to decision block 2130.

At block decision 2130, the controller determines if the new flow signature corresponds to an existing flow entry in the flow tables. When the new flow signature is part of an existing flow entry, processing proceeds from block 2130 to block 2170 where the flow table is updated (i.e., the DFS flow table in a segmented controller). Processing continues from block 2170 to block 2180.

Returning to decision block 2130, processing flows from decision block 2130 to decision block 2140 when the new flow signature is not recognized by the DFS (not found in the DFS flow table). At decision block 2140, the DFS analyzes the DFS flow table to determine if the DFS flow table is full. When the DFS flow table is full, processing proceeds to block 2150 where the DFS creates a free space in the DFS flow table. The space may be made available by any appropriate criteria such as, for example, deleting the oldest flow signature entry. Processing proceeds from block 2150 to block 2160 where the new flow signature is entered into the DFS flow table based upon the instructions provided by the CS. Processing also proceeds to block 2160 from decision block 2140 when the DFS table is not full. From block 2160, processing proceeds to block 2180 where processing is concluded.

CS Message Processing

Figure 22:
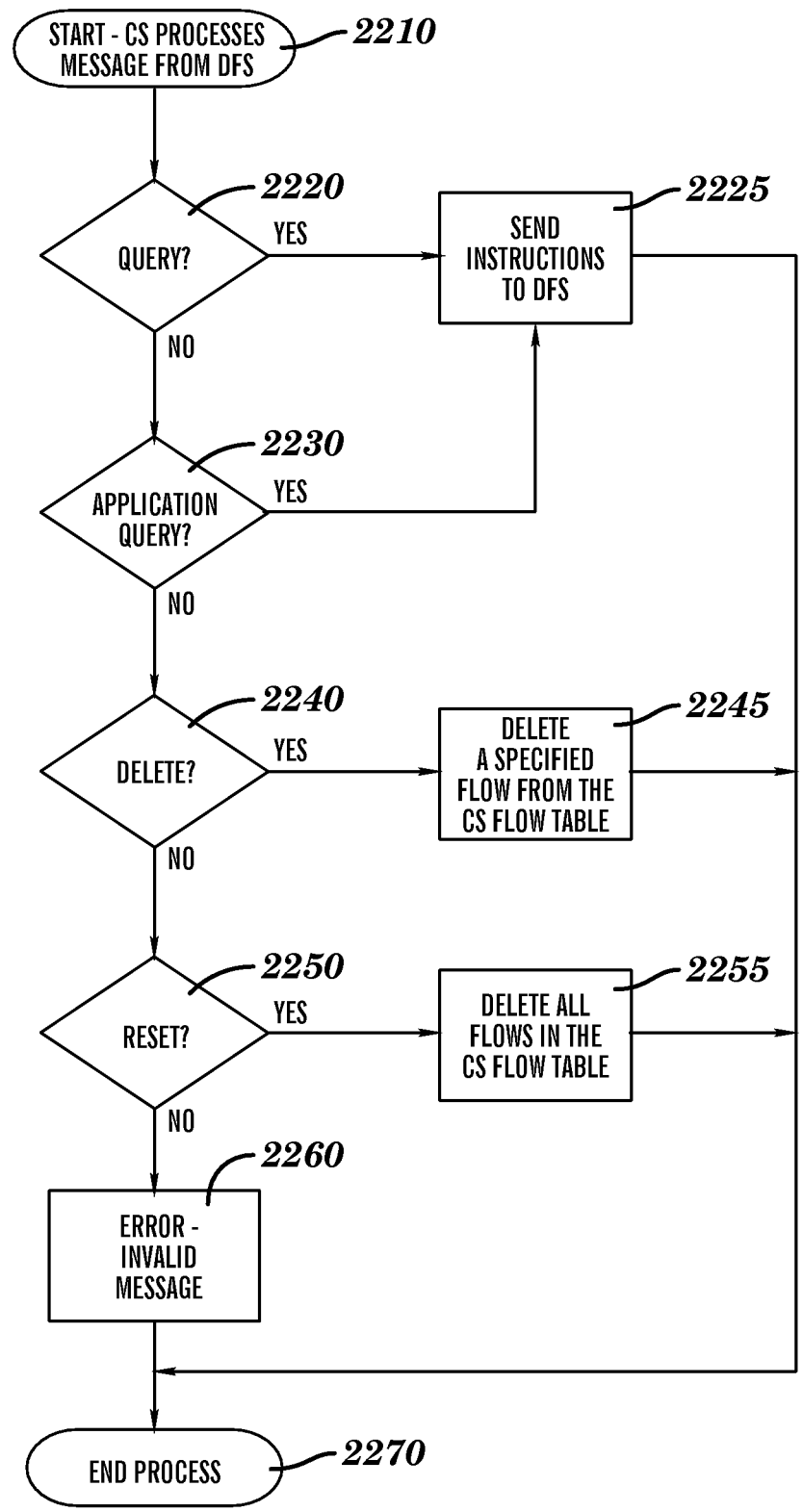
FIG. 22 is a flow chart of message processing for a control segment (CS) in an exemplary partitioned controller.

Messages received by the CS from the DFS are generally described as shown in FIG. 22. Processing begins at start block 2210 and proceeds to block 2220 where the CS begins parsing the received message. At block 2220 the CS determines if the received message is a request for instructions (e.g. QUERY) related to a particular flow. When the message indicates a request for instructions, processing proceeds from block 2220 to block 2225. Otherwise processing proceeds from block 2220 to block 2230. At block 2225, the CS analyzes the particular flow described in the received message and determines how to the DFS is to handle routing or switching the packets related to that flow. The CS may use any appropriate method to determine the routing/switching of packets such as, for example, based upon load-balancing. The CS subsequently sends a message (e.g. REPLY) to the DFS containing instructions for handling the flow.

At block 2230 the CS determines if the received message is an application request for data from a server. When the message indicates such a request (e.g. AP_QUERY), processing proceeds from block 2230 to block 2225. Otherwise processing proceeds from block 2230 to block 2240.

At block 2240 the CS determines if the received message is a request from the DFS for a particular flow to be deleted from the CS flow tables. When the message indicates that the particular flow is to be deleted (e.g. DELETE), processing proceeds from block 2240 to block 2245. Otherwise, processing proceeds from block 2240 to block 2250. At block 2245, the CS deletes the particular flow from the CS flow table.

At block 2250, the CS determines if the received message is a request from the DFS (or another CS) to reset the system. When the message indicates a system reset (e.g. RESET), processing proceeds from block 2250 to block 2255. Otherwise, processing proceeds from block 2250 to block 2260.

At block 2260, the CS determines that an invalid message has been received. Alternatively, the CS may process other message types as may be required in a particular application. From block 2260, processing proceeds to block 2270 where processing is completed. Processing also proceeds to block 2270 from blocks 2225, 2245, and 2255.

Controller Sequence

Figure 23:
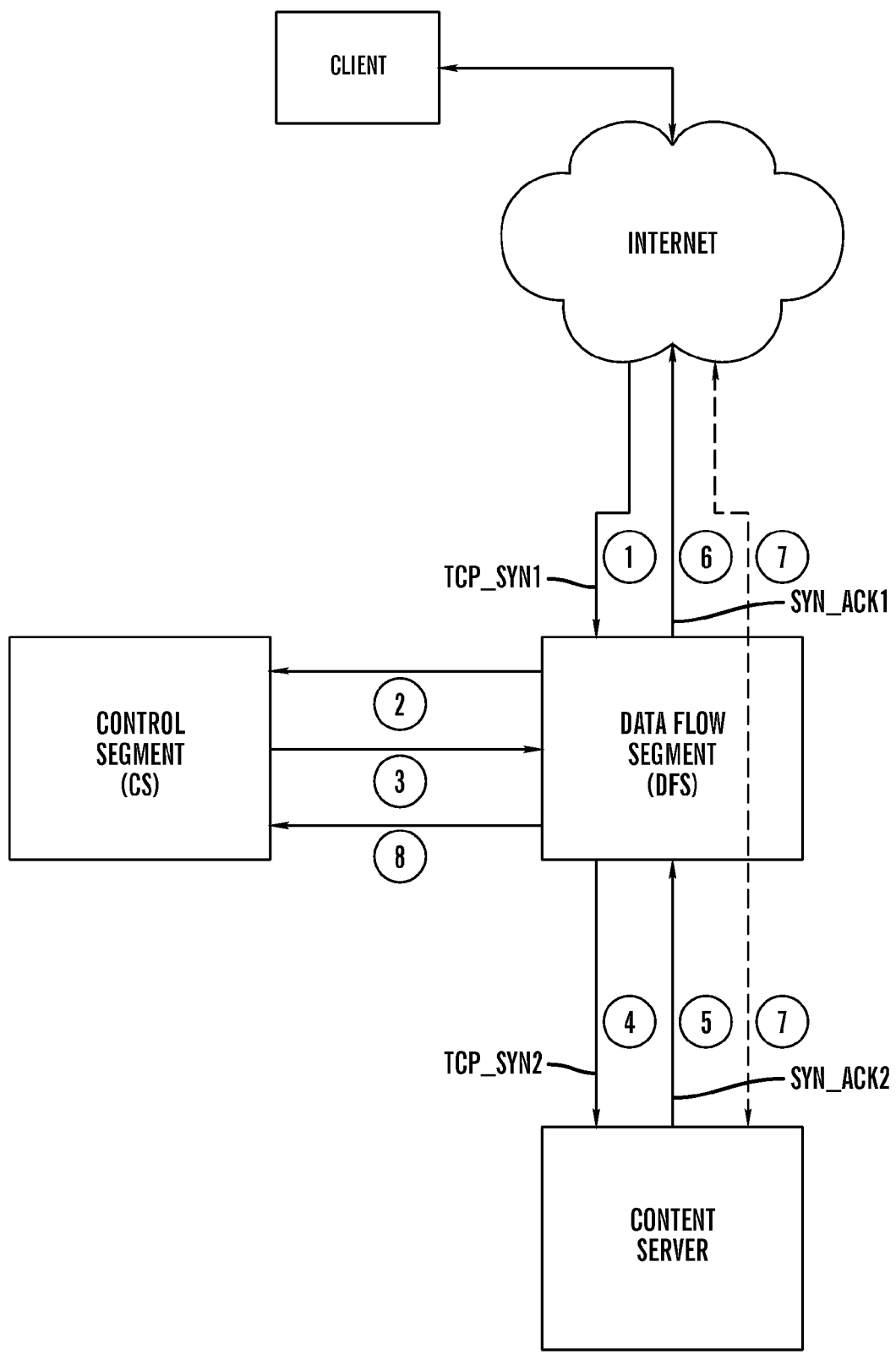
FIG. 23 is a system diagram of a sequence employed by a controller.

FIG. 23 is a system diagram of a sequence employed by a segmented controller. As shown in FIG. 23, a client is connected to the data flow segment (DFS) in the segmented controller through the Internet (external network). A control segment (CS) is connected to the DFS through at least one port. Optionally, additional control segments (not shown) may also be connected to the data flow segment (DFS). A content server is connected to the DFS through at least one other port. Numbers 1-8 identifies the timing sequence of steps employed by the controller for an example flow as will be described below.

A previously unidentified client sends a connection request to a server through the Internet. Initially, the controller receives the connection request from the external network (the Internet) as identified by timing sequence 1. The client request may be a TCP/IP Synchronize request (TCP_SYN1) as found in the TCP header.

The DFS receives the request and analyzes the flow signature to determine if the client is identified in the current flow table (i.e., by the client IP address). After determining that the requesting client is unknown, the DFS sends a request to the CS for instructions on handling the new flow in timing sequence 2. The request includes pertinent information that is required by the CS (i.e., destination IP address, destination port number, etc.).

The CS receives the request for instructions and may perform a number of statistical and load-balancing calculations as previously described. After the CS has determined how to handle the new connection request, the CS sends instructions to the DFS in timing sequence 3.

The DFS receives the instructions from the CS and analyzes the message. The DFS creates a new entry in the flow table for the new connection request, logging the pertinent data for the connection (i.e., the source IP address, source port number, destination IP address, selected content server, etc.). The DFS then transforms the connection request and forwards the transformed connection request (TCP_SYN2) to the selected content server in timing sequence 4.

The content server receives the transformed connection request (TCP_SYN2) and sets up a TCP/IP connection. The content server creates a TCP/IP header that includes a connection acknowledgement (SYN_ACK2) in response to the transformed synchronization request (TCP_SYN2). The TCP/IP acknowledgment message (SYN_ACK2) is forwarded from the content server to the DFS in timing sequence 5.

The DFS receives the TCP acknowledgement message (SYN_ACK2) from the content server. The DFS then transforms the acknowledgement message and forwards the transformed acknowledgement message (SYN_ACK1) to the client via the external network (i.e., the Internet) in timing sequence 6.

Following transmission of the SYN_ACK2 message, the content server transmits the requested content from the content server to the DFS in timing sequence 7. The DFS performs transformations on each packet such that the requested content is sent from the content server through the DFS and the external network to the client for the remaining transmissions.

At the end of the transmission sequence, the content server sends a message in a TCP/IP header that identifies the last packet has been sent (FIN). The DFS receives the end of transmission header and sends a message to the CS to indicate the end of the transmission in timing sequence 8. The DFS then deletes the flow entry from the flow table that is associated with the completed transmission.

In the present invention, when a client sends multiple requests for multiple connections to the same destination address (i.e., in an HTTP 1.0 request), only the first connection will require all of the timing sequences 1-8. The remaining connections up to "N" will not require steps 2, 3, and 8. Instead, the remaining connections will reuse the connection information that was identified in the first connection by the CS.

In one example, the content server that is selected corresponds to the same content server for the next "N" connection requests based on the client IP address, destination IP address, and destination port number. In another example, the content server that is selected corresponds to the same content server for the next "N" connection requests based on the client IP address, client port number, and the destination address. The client port number may be utilized by the DFS to distinguish between requests that have the same client IP address. In still another example, the content server that is selected corresponds to the same content server for the next "N" connection requests based all or part of the port address for the client and/or the server. For example, one-quarter to one-half of the upper hits for the port identifier may be used to identify a particular client.

The work required for a load-balancing decision is greater than that for a transformation. The work is partitioned such that the CS and the DFS each perform a portion of the work. The DFS and CS process steps 1-8, which each have an associated work corresponding to "a"-"h", such that the total work associated with a load balancing decision corresponds to (a+b+c+d+e+f+g+h). The CS processes steps 2, 3, and 8 such that the total work apportioned to the CS corresponds to (b+c+h). However, each load balancing decision is cached such that each cached load balancing decision may be reused up to "N" times. The total work that is required by the CS is amortized such that the work performed by the CS for each individual connection corresponds to [(b+c+h)/N]. The total work that is performed for each load-balancing decision thus corresponds to (a+d+e+f+g+[(b+c+h)/N]). The caching of the load-balancing decision results in an overall reduction in work on a per connection basis.

The latency resulting from each load balancing decision is related to the required work discussed above. The minimum number of connections required for the first connection is determined by: (x+y), where "x" is the latency associated with steps 2, 3 and 8, and "y" is the latency associated with steps 1, and 4-6. For this example, each subsequent connection has a latency corresponding to only y. Thus, for "N" connections, the total latency in setting up the connections: x+(N·y). Since (N−1) of the connections have a reduced latency in establishing their connections, faster overall connection speeds are observed by the client at the cost of reduced granularity in the load balancing. However, the average load balancing performance is modestly impacted by the reduced granularity.

Although the above controller sequence and examples are described with reference to a segmented controller that includes a DFS and a CS, the methodology also applies to a non-segmented controller. For example, the functions of the CS and DFS may be combined in a controller that is arranged to selectively apply a load-balancing algorithm to the connections requested from a particular client. In this instance, the messaging between the CS and DFS are superfluous, and the controller only applies a load balancing decision to the first of N connections requested by the same client.

Controller Operating States

Figure 24:
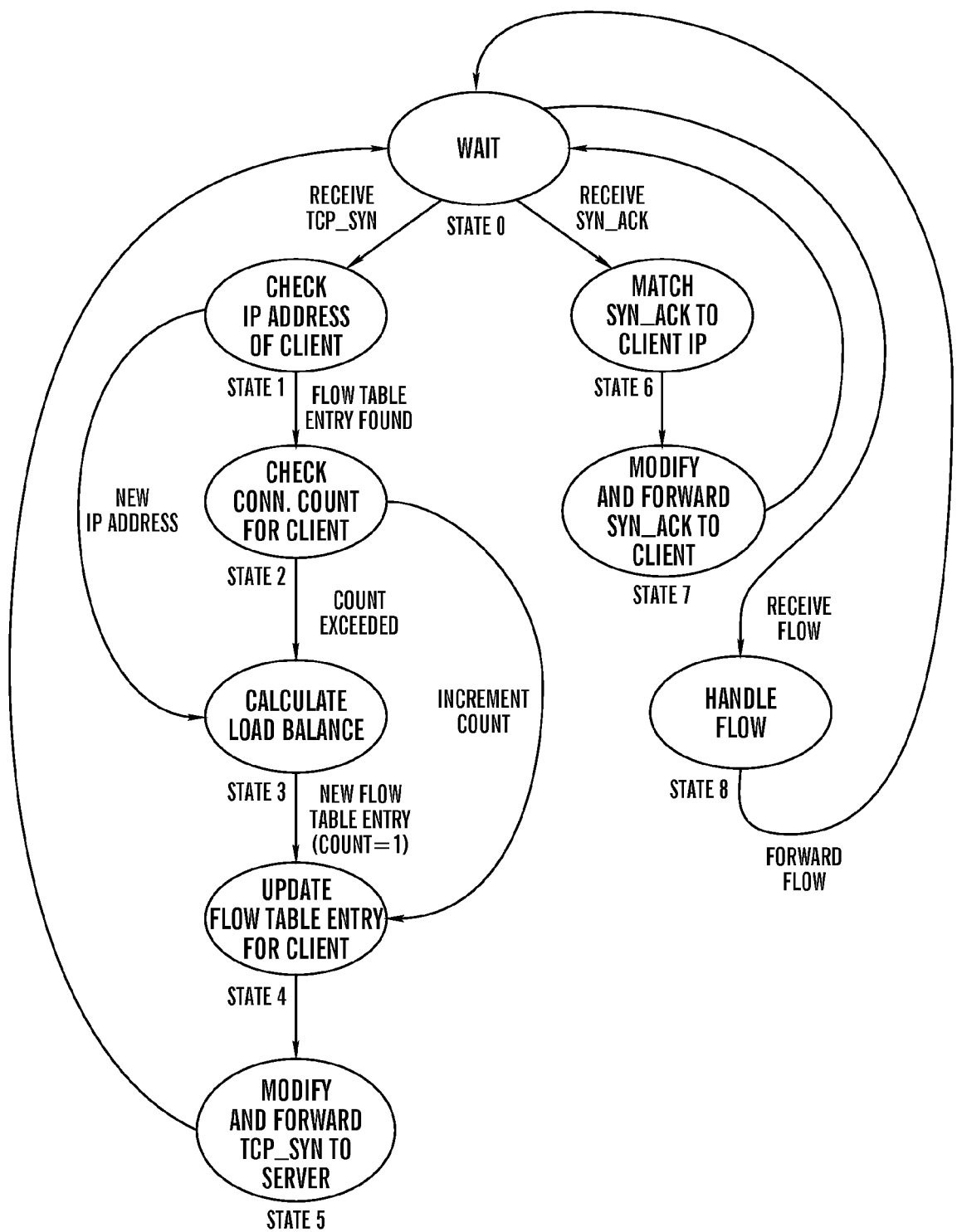
FIG. 24 is a state diagram of a control sequence that is in accordance with the present invention.

FIG. 24 is a state diagram of a control sequence that is in accordance with the present invention. The discussion of the controller operation begins in a WAIT state (state 0).

While in state 0, the controller awaits the receipt of a connection request, a connection acknowledgment, or a continuation of a previously initiated flow. When a connection request is received from a client (RECEIVE TCP_SYN) the controller transitions to state 1. When a connection acknowledgement is received from a server (RECEIVE SYN_ACK), the controller transitions from state 0 to state 6. When a continuation of a previously initiated flow is received, the controller transitions from state 0 to state 8.

In state 1, the controller checks the IP address of the client (CHECK IP ADDRESS OF CLIENT). When the IP address of the client is found in the current flow table (FLOW TABLE ENTRY FOUND), the controller transitions from state 1 to state 2. The controller transitions from state 1 to state 3 when the IP address of the client is not found in the flow table (NEW IP ADDRESS).

In state 2, the controller checks the number of connections that are currently associated with the client (CHECK CONN. COUNT FOR CLIENT). The controller transitions from state 2 to state 3 when the current number of connections exceeds the maximum permissible connections (i.e., COUNT EXCEEDS "N"). The controller increments the current connections count and transitions from state 2 to state 4 when the number of currently active connections in the flow table is less than the maximum number of permissible connections (i.e., COUNT<N).

In state 3, the controller performs a load balancing calculation (CALCULATE LOAD BALANCE). After the load balancing calculation is completed, the controller creates a new flow table entry, initializes a counter (i.e., count=1), and transitions from state 3 to state 4.

In state 4, the flow tables are updated based upon the new client connection information (UPDATE FLOW TABLE ENTRY FOR CLIENT). The controller transitions from state 4 to state 5.

In state 5, the TCP_SYN message is modified and forwarded to the selected server (MODIFY AND FORWARD TCP_SYN TO SERVER). After the message is forwarded to the selected server, the controller transitions from state 5 to state 0.

In state 6, the acknowledgement message (SYN_ACK) is matched to a client IP address in the flow table (MATCH SYN_ACK TO CLIENT IP). After the message is matched to the client IP address, the controller transitions from state 6 to state 7.

In state 7, the SYN_ACK message is modified and forwarded to the identified client (MODIFY AND FORWARD SYN_ACK TO client). After the message is forwarded to the identified client, the controller transitions from state 7 to state 0.

In state 8, the controller receives flows (RECEIVE FLOW) from a selected server, and transforms the flows as required by the matched client (HANDLE FLOWS). The transformed flows are then forwarded (FORWARD FLOW) to the identified client as found in the flow tables, and the controller transitions from state 8 to state 0.

The logical operations of the various embodiments of the invention are implemented as a sequence of computer implemented actions or program modules running on one or more computing devices; and/or as interconnected hardware or logic modules within the one or more computing devices. The implementation is a matter of choice dependent on the performance requirements of the computing system implementing the invention. Accordingly, the logical operations making up the embodiments of the invention described herein are referred to alternatively as operations, actions or modules. Program modules may be described as any construct (e.g. routines, programs, objects, components, and data structures) that perform particular tasks or implement particular abstract data types. The functionality of program modules may be combined or distributed in various embodiments.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A traffic management apparatus for directing communications over a network between an identified client and at least one server, the apparatus comprising:
   a memory configured to store a data structure containing a plurality data flows along with corresponding flow signatures;
   a network interface coupled to the memory, the network interface having a data component configured to receive and transmit network data packets over one or more networks, wherein the network interface receives a resource request from a client, the network interface further configured to:
   identify a flow signature associated with the resource request to identify the client; and
   access the data structure in the memory and compare at least a portion of the identified flow signature with the flow signatures of other data flows; and
   identify a related data flow from the data structure that is related to the data flow of the resource request, the related data flow having an associated routing instruction which causes the network interface to directly:

select an identified server to handle the resource request from the identified client if the number of existing connections between the identified server and the client has not exceeded the predetermined number of allowed connections; and select a new server to handle the resource request from the identified client if the number of existing connections between the identified server and the identified client exceeds the predetermined number of allowed connections.

2. The apparatus of claim 1, further comprising a server array controller that includes the action of the data component and control component.

3. The apparatus of claim 1, wherein the control component is arranged to maintain a connection count that is associated with the number of connections between the identified client and the server selected by the data component, wherein the connection count is amended when a new connection is established between the identified client and the selected content server.

4. The apparatus of claim 1, wherein the connection count is compared to the preestablished number of resource requests that is associated with the identified client and the identified server.

5. The apparatus of claim 2, wherein the connection count is associated with a source address and a destination address, wherein the source address is associated with the identified client and the destination address is associated with the resource request.

* * * * *